United States Patent
Jawale et al.

(10) Patent No.: US 11,580,961 B1
(45) Date of Patent: *Feb. 14, 2023

(54) TRACKING SPECIALIZED CONCEPTS, TOPICS, AND ACTIVITIES IN CONVERSATIONS

(71) Applicant: Rammer Technologies, Inc., Seattle, WA (US)

(72) Inventors: Toshish Arun Jawale, Seattle, WA (US); Anthony Claudia, Boulder, CO (US); Surbhi Rathore, Seattle, WA (US)

(73) Assignee: Rammer Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,055

(22) Filed: Apr. 9, 2022

Related U.S. Application Data

(63) Continuation of application No. 17/523,355, filed on Nov. 10, 2021, now Pat. No. 11,302,314.

(51) Int. Cl.
*G10L 15/18* (2013.01)
*G10L 15/22* (2006.01)
(Continued)

(52) U.S. Cl.
CPC .......... *G10L 15/1815* (2013.01); *G06F 40/30* (2020.01); *G06N 3/04* (2013.01);
(Continued)

(58) Field of Classification Search
CPC ....... G10L 15/30; G10L 15/22; G10L 15/063; G10L 15/1815; G06N 3/04; G06F 40/30; G06F 40/40
See application file for complete search history.

(56) References Cited

U.S. PATENT DOCUMENTS

| | | | | |
|---|---|---|---|---|
| 7,814,048 | B2 * | 10/2010 | Zhou | G06F 16/35 707/602 |
| 8,577,671 | B1 | 11/2013 | Barve et al. | |

(Continued)

FOREIGN PATENT DOCUMENTS

| | | | | |
|---|---|---|---|---|
| CN | 111191450 A | * | 5/2020 | G06F 40/30 |
| CN | 111191450 A | | 5/2020 | |

OTHER PUBLICATIONS

Office Communication for U.S. Appl. No. 17/246,495 dated Jun. 28, 2021, pp. 1-26.

(Continued)

*Primary Examiner* — Michael Colucci
(74) *Attorney, Agent, or Firm* — John W. Branch; Branch Partners PLLC

(57) ABSTRACT

Embodiments are directed to organizing conversation information. A tracker vocabulary may be provided to a universal model to predict a generalized vocabulary associated with the tracker vocabulary. A tracker model may be generated based on the portions of the universal model activated by the tracker vocabulary such that a remainder of the universal model may be excluded from the tracker model. Portions of a conversation stream may be provided to the tracker model. A match score may be generated based on the track model and the portions of the conversation stream such that the match score predicts if the portions of the conversation stream may be in the generalized vocabulary predicted for the tracker vocabulary. Tracker metrics may be collected based on the portions of the conversation and the match scores such that the tracker metrics may be included in reports or notifications.

20 Claims, 13 Drawing Sheets

(51) Int. Cl.
*G06N 3/04* (2006.01)
*G10L 15/06* (2013.01)
*G10L 15/30* (2013.01)
*G06F 40/30* (2020.01)

(52) U.S. Cl.
CPC ............ *G10L 15/063* (2013.01); *G10L 15/22* (2013.01); *G10L 15/30* (2013.01)

(56) References Cited

U.S. PATENT DOCUMENTS

| | | | |
|---|---|---|---|
| 9,201,927 B1 | 12/2015 | Zhang | |
| 9,367,608 B1 | 6/2016 | Zhang | |
| 10,754,883 B1 * | 8/2020 | Kannu | G06F 16/3334 |
| 11,093,718 B1 | 8/2021 | Jawale et al. | |
| 11,132,988 B1 * | 9/2021 | Steedman Henderson | G10L 15/22 |
| 11,263,407 B1 | 3/2022 | Jawale et al. | |
| 11,302,310 B1 * | 4/2022 | Gandhe | G10L 15/01 |
| 2004/0243388 A1 | 12/2004 | Corman et al. | |
| 2005/0278325 A1 | 12/2005 | Mihalcea et al. | |
| 2007/0156625 A1 | 7/2007 | Visel | |
| 2013/0046531 A1 | 2/2013 | Chandramouli et al. | |
| 2015/0006155 A1 | 1/2015 | Tanigaki et al. | |
| 2015/0032441 A1 * | 1/2015 | Marcus | G06F 40/211 704/9 |
| 2015/0095770 A1 | 4/2015 | Mani et al. | |
| 2015/0186504 A1 | 7/2015 | Gorman et al. | |
| 2015/0286629 A1 | 10/2015 | Abdel-Reheem et al. | |
| 2016/0179945 A1 | 6/2016 | Lastra Diaz et al. | |
| 2016/0306791 A1 | 10/2016 | Allen et al. | |
| 2016/0316059 A1 * | 10/2016 | Nuta | G06Q 10/04 |
| 2017/0053206 A1 | 2/2017 | Kala et al. | |
| 2017/0212884 A1 * | 7/2017 | Kim | G06F 40/40 |
| 2017/0249668 A1 | 8/2017 | Delort | |
| 2017/0256255 A1 * | 9/2017 | Bocklet | G10L 17/22 |
| 2017/0270096 A1 | 9/2017 | Sheafer et al. | |
| 2017/0277781 A1 | 9/2017 | Deolalikar | |
| 2017/0316777 A1 * | 11/2017 | Perez | G06F 40/169 |
| 2018/0165554 A1 | 6/2018 | Zhang et al. | |
| 2018/0268298 A1 * | 9/2018 | Johansen | G06V 10/764 |
| 2018/0351899 A1 | 12/2018 | Kano et al. | |
| 2018/0373696 A1 | 12/2018 | Terry et al. | |
| 2019/0005329 A1 | 1/2019 | Misra et al. | |
| 2019/0042988 A1 | 2/2019 | Brown et al. | |
| 2019/0294668 A1 | 9/2019 | Goel et al. | |
| 2019/0332668 A1 | 10/2019 | Wang et al. | |
| 2019/0378513 A1 | 12/2019 | Carnevale et al. | |
| 2019/0384813 A1 | 12/2019 | Mahmoud | |
| 2020/0004517 A1 | 1/2020 | Legler | |
| 2020/0005117 A1 | 1/2020 | Yuan et al. | |
| 2020/0110943 A1 | 4/2020 | Gunawardena | |
| 2020/0143115 A1 | 5/2020 | Brigham et al. | |
| 2020/0243094 A1 * | 7/2020 | Thomson | G10L 15/22 |
| 2020/0279017 A1 | 9/2020 | Norton et al. | |
| 2021/0004443 A1 * | 1/2021 | Sapugay | G06F 16/24556 |
| 2021/0042467 A1 | 2/2021 | Liu et al. | |
| 2021/0104014 A1 * | 4/2021 | Kolb, V | G06T 5/003 |
| 2021/0374677 A1 | 12/2021 | Michels | |

OTHER PUBLICATIONS

Office Communication for U.S. Appl. No. 17/246,463 dated Jul. 1, 2021, pp. 1-9.
Office Communication for U.S. Appl. No. 17/246,463 dated Jul. 8, 2021, pp. 1-6.
Office Communication for U.S. Appl. No. 17/246,495 dated Oct. 12, 2021, pp. 1-29.
Office Communication for U.S. Appl. No. 17/389,145 dated Nov. 30, 2021, pp. 1-9.
Office Communication for U.S. Appl. No. 17/246,495 dated Jan. 5, 2022, pp. 1-29.
Office Communication for U.S. Appl. No. 17/523,355 dated Feb. 3, 2022, pp. 1-11.
Office Communication for U.S. Appl. No. 17/523,355 dated Mar. 1, 2022, pp. 1-8.
Office Communication for U.S. Appl. No. 17/389,145 dated Mar. 10, 2022, pp. 1-10.
Office Communication for U.S. Appl. No. 17/523,355 dated Mar. 16, 2022, pp. 1-9.
Office Communication for U.S. Appl. No. 17/682,682 dated Jul. 7, 2022, pp. 1-28.
Siddiqui, Nadia et al., "ConVisQA: A Natural Language Interface for Visually Exploring Online Conversations," 2020 24th International Conference Information Visualisation (IV), 2020, pp. 440-447.
Vilhjálmsson, Hannes Högni, "Augmenting Online Conversation through Automated Discourse Tagging," In Proceedings of the 38th Annual Hawaii International Conference on System Sciences, Jan. 2005, pp. 1-10.
Office Communication for U.S. Appl. No. 17/839,274 dated Aug. 17, 2022, pp. 1-11.

* cited by examiner

```
const connection = await sdk.startRealtimeRequest({
    id,
    trackers: [
        {
            name: "COVID-19",
            vocabulary: [
                "social distancing",
                "cover your face with mask",
                "vaccination"
            ]
        }
    ],
    config: {
        trackers: {
            "interimResults": true
        }
    },
    handlers: {
        onTrackerResponse: (data) => {
            // When a tracker is detected in real-time
            console.log('onTrackerResponse', JSON.stringify(data, null, 2));
        },
    },
})
```

Fig. 13

TRACKING SPECIALIZED CONCEPTS, TOPICS, AND ACTIVITIES IN CONVERSATIONS

CROSS-REFERENCE TO RELATED APPLICATION

This Utility Patent Application is a Continuation of U.S. patent application Ser. No. 17/523,355 filed on Nov. 10, 2021, now U.S. Pat. No. 11,302,314 issued on Apr. 12, 2022, the benefit of which is claimed under 35 U.S.C. § 120, and the contents of which is further incorporated in entirety by reference.

TECHNICAL FIELD

The present invention relates generally to processing natural language speech, and more particularly, but not exclusively to, determining topics and actions from speech.

BACKGROUND

Machine processing or analysis of conversational speech and associated activity is becoming increasing important to organizations. Accordingly, organizations may endeavor to capture or analyze speech generated during private/internal meetings, public presentations, customer interactions, or the like. Conventionally, organizations may employ machine transcription services, human transcription services, or hybrid machine-human transcription services to transform natural speech into text suitable for machine analysis, processing, or indexing. Accordingly, organizations may develop databases, search engines, or the like, that enable users to perform analysis of the contents of the captured speech, such as, word/phrase identification (e.g., searching), context free statistical analysis (e.g., word counts, word distributions, or the like), and so on. In some cases, organizations may devote significant resources to train or attempt to train machine learning models that may provide additional insights about conversations. However, the variations in speech patterns, mid-conversation context switches, domain specific vocabulary, cultural specific vocabulary, varying number of speakers in one conversations, background activity/sounds, or the like, may make it prohibitively expensive or impossible to train the machine learning models necessary for gaining additional insights from capture conversations. Further, in some cases, organizations may find value in tracking the occurrence of certain key words or phrases in conversations so they can identify emerging trends and gauge the nature of interactions among speakers. Likewise, identifying sounds, actions, audio signals, or the like, that may occur in or around conversations may provide valuable metrics as well that may be correlated with speech. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 13 illustrates a portion of a data structure for initializing tracker models for tracking concepts, topics, or activities in conversations in accordance with one or more of the various embodiments.

DETAILED DESCRIPTION OF VARIOUS EMBODIMENTS

Figure 1:
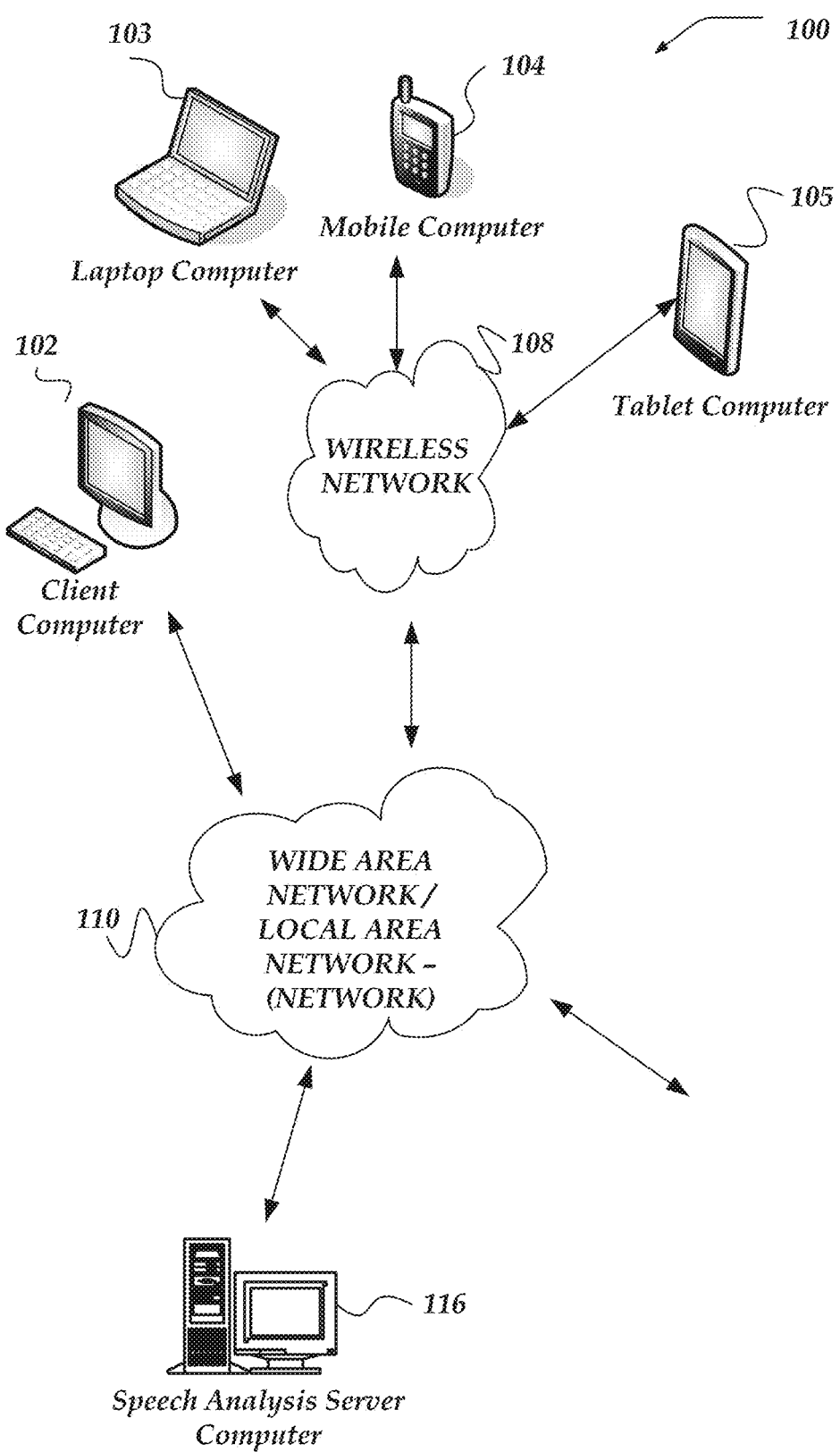
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, Rust, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "conversation" refers to a time-bound exchange of communicative speech between two or more persons. A conversation may be considered time-bound because they have a definite start time and end time. In some cases, a conversation may be a portion of larger conversation, but the conversation (the sub-conversation) may still have its own start time and end time. Also, conversations may be considered synchronous communication among or between two or more people. In some cases, a conversation may include only one speaker that is speaking to other persons (e.g., speeches, presentations, or the like). Conversations may occur in meetings, teleconferences, video conferences, presentations, speeches, or the like. In some cases, conversations may be recorded for playback later. Conversations may include multiple speakers, some who may be more important or more relevant than others. Typically, conversations may include one or more main subjects and one or more topics associated with the main subject. However, reflective of how person communicate, conversations may include portions that may be unrelated to a main subject of topic. For example, in some cases, conversations may include so-called small-talk, irrelevant cross-talk, side discussions, tangential discussions, or the like. Also, conversations, even though conversations may be comprised of synchronous communication exchanges, the subject or topic under consideration may jump around. Even speakers or presenters using well-defined outlines or agenda may jump back and forth within their outline/agenda. Further, in some cases, conversations may include a combination of speech, text chats, emails, or the like. In some cases, a conversation may be considered to be a stream of inputs, such as, text, video, audio, spatial information, or the like, that may be provided. In some cases, one conversation may include sub-conversation of different modalities. For example, a conversation that includes two persons speaking may include a text/speech conversation, a video conversation, an audio conversation, or the like, all occurring at the same time.

As used herein the terms "vocabulary," "vocabulary words," or "vocabulary items" refer to a set of one or more words or phrases, audio samples, video samples, spatial information, or the like. In some cases, vocabulary may be selected from a conversation stream. In other cases, users, or the like, may declare one or more vocabularies. In some cases, various signals or inputs besides the speech or text of a conversation may be considered a vocabulary. For example, specific types of inputs, including audio streams, sounds, video activity, or the like, may be considered vocabulary for the purpose of tracking them within conversation. For example, a doorbell sound may be considered a vocabulary word or vocabulary item. Thus, in some cases, a collection of audio samples, images, video samples, or the like, may be considered a vocabulary. In some cases, spatial information provided from virtual reality (VR) or augmented reality (AR) systems may be considered vocabulary items. Likewise, in some cases, spatial information provided from other sources, such as, motion detectors, range finders, or the like, may be considered vocabulary items.

As used herein the terms "universal generalization model," or "universal model" refer to a machine learning model that is trained to predict a larger (expanded) collection of vocabulary items of a given modalities, such as, speech, sounds, gestures, screen activity, or the like. For example, a universal model may be trained to predict words or phrases that may have the same semantic meaning or usage as a set of input vocabulary words or phrases. In some cases, universal models may be trained on large datasets such that may be employed to generalize a wide variety of input vocabulary into larger expanded vocabularies. Likewise, different universal models may be directed to different vocabulary modalities, such as, audio, video, or the like. In some cases, different universal models may be directed to different semantic categories or different activity categories.

As used herein the term "tracker vocabulary" refers a vocabulary that is identified as being of interest. Tracker vocabularies may be provided or defined by users, or the like. Tracker vocabularies may be comprised of text, speech samples, audio samples, video samples spatial information, or the like.

As used herein the term "tracker model" refers to an optimized model that is configured to score if a portion of a conversation (a conversation snippet) matches meaning or usage of a corresponding tracker vocabulary. For example, tracker models may be employed to determine in real-time if the speech in a conversation that may match the meaning, usage, or sentiment of a corresponding tracker vocabulary. Also, in some cases, tracker models may be provided for tracking audio/sounds, gestures/movement (in video), or the like.

As used herein the term "tracker metrics" refers to one or more metrics that may be collected or computed based on determining portions of a conversation that may match tracker models. Tracker metrics may include, timestamps in conversations where matches occurred, measures of the proportion of conversation that matched one or more tracker models, counting/measuring matches for different speakers in the conversation, or the like. In some cases, tracker metrics may include correlating results from multiple tracker models.

As used herein the term "configuration information" refers to information that may include rule based policies, pattern matching, scripts (e.g., computer readable instructions), or the like, that may be provided from various sources, including, configuration files, databases, user input, plugins, extensions, loadable libraries, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to organizing conversation information over a network using one or more network computers. In one or more of the various embodiments, a tracker vocabulary may be provided to a universal model to predict a generalized vocabulary associated with the tracker vocabulary such that the tracker vocabulary includes one or more vocabulary items and such that the universal model may be trained to predict the generalized vocabulary that corresponds to the tracker vocabulary.

In one or more of the various embodiments, one or more portions of the universal model that are activated to predict the generalized vocabulary for the tracker vocabulary may be determined.

In one or more of the various embodiments, a tracker model may be generated based on the one or more portions of the universal model that may be activated by the tracker vocabulary such that a remainder of the universal model may be excluded from the tracker model.

In one or more of the various embodiments, one or more portions of a conversation stream may be provided to the tracker model.

In one or more of the various embodiments, a match score may be generated based on the track model and the one or more portions of the conversation stream such that the match score predicts if the one or more portions of the conversation stream may be in the generalized vocabulary predicted for the tracker vocabulary.

In one or more of the various embodiments, one or more tracker metrics may be collected based on the one or more portions of the conversation and the one or more match scores such that the one or more tracker metrics may be included in one or more reports or notifications.

In one or more of the various embodiments, determining the one or more portions of the universal model may include determining one or more artificial neural network nodes in the universal model that were activated to predict the generalized vocabulary based on one or more activation functions associated with the one or more artificial neural network nodes.

In one or more of the various embodiments, providing the one or more portions of the conversation stream may include, determining a buffer size based on one or more characteristics of the tracker vocabulary and the predicted generalized vocabulary. In one or more of the various embodiments, one or more portions of the conversation stream may be stored in the buffer. And, in some embodiments, in response to the buffer being filled, the one or more portions of the conversation stream may be provided to the tracker model.

In one or more of the various embodiments, generalization training data that includes one or more source vocabularies and one or more generalized vocabularies may be provided. In some embodiments, a candidate universal model that is untrained may be provided. In some embodiments, the candidate universal model may be employed to provide one or more candidate predictions of the one or more generalized vocabularies that match the one or more source vocabularies. In some embodiments, one or more correct predictions from the one or more candidate predictions may be determined based on the one or more source vocabularies and the one or more generalized vocabularies. In one or more of the various embodiments, the candidate universal model may be updated based on the one or more correct predictions. And, in some embodiments, in response to a proportion of the one or more correct predictions versus one or more incorrect predictions exceeding a threshold value, employing the candidate universal model as the universal model.

In one or more of the various embodiments, the one or more tracker metrics may include one or more of, a timestamp in the conversation stream where the match score exceeded a threshold value, a value of a proportion of the conversation stream that matched one or more tracker models, a count of matches in the conversation stream for different speakers, or the like.

In one or more of the various embodiments, predicting the generalized vocabulary associated with the tracker vocabulary may include predicting one or more words or phrases that may be associated with one or more of a topic, a semantic meaning, a usage, a sentiment, or an action that may be consistent with one or more of the topic, the semantic meaning, the usage, the sentiment, or the action associated with the tracker vocabulary, or the like.

In one or more of the various embodiments, providing the one or more portions of the conversation stream may include providing the one or more portions of the conversation streams from one or more of a real-time spoken conversation, a text-based chat session, an email, a comment on an online forum, or the like.

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)— (network) 110, wireless network 108, client computers 102-105, speech analysis server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, speech analysis server computer 116, or other computers.

Client computers 102-105 may further be configured to include a client application that enables an end-user to log into an end-user account that may be managed by another computer, such as v speech analysis server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by speech analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, speech analysis server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of speech analysis server computer 116 are described in more detail below in conjunction with FIG. 3. Although FIG. 1 illustrates speech analysis server computer 116, or the like, each as a single computer, the innovations or embodiments are not so limited. For example, one or more functions of speech analysis server computer 116, or the like, may be distributed across one or more distinct network computers. Moreover, in one or more embodiments, speech analysis server computer 116 may be implemented using a plurality of network computers. Further, in one or more of the various embodiments, speech analysis server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
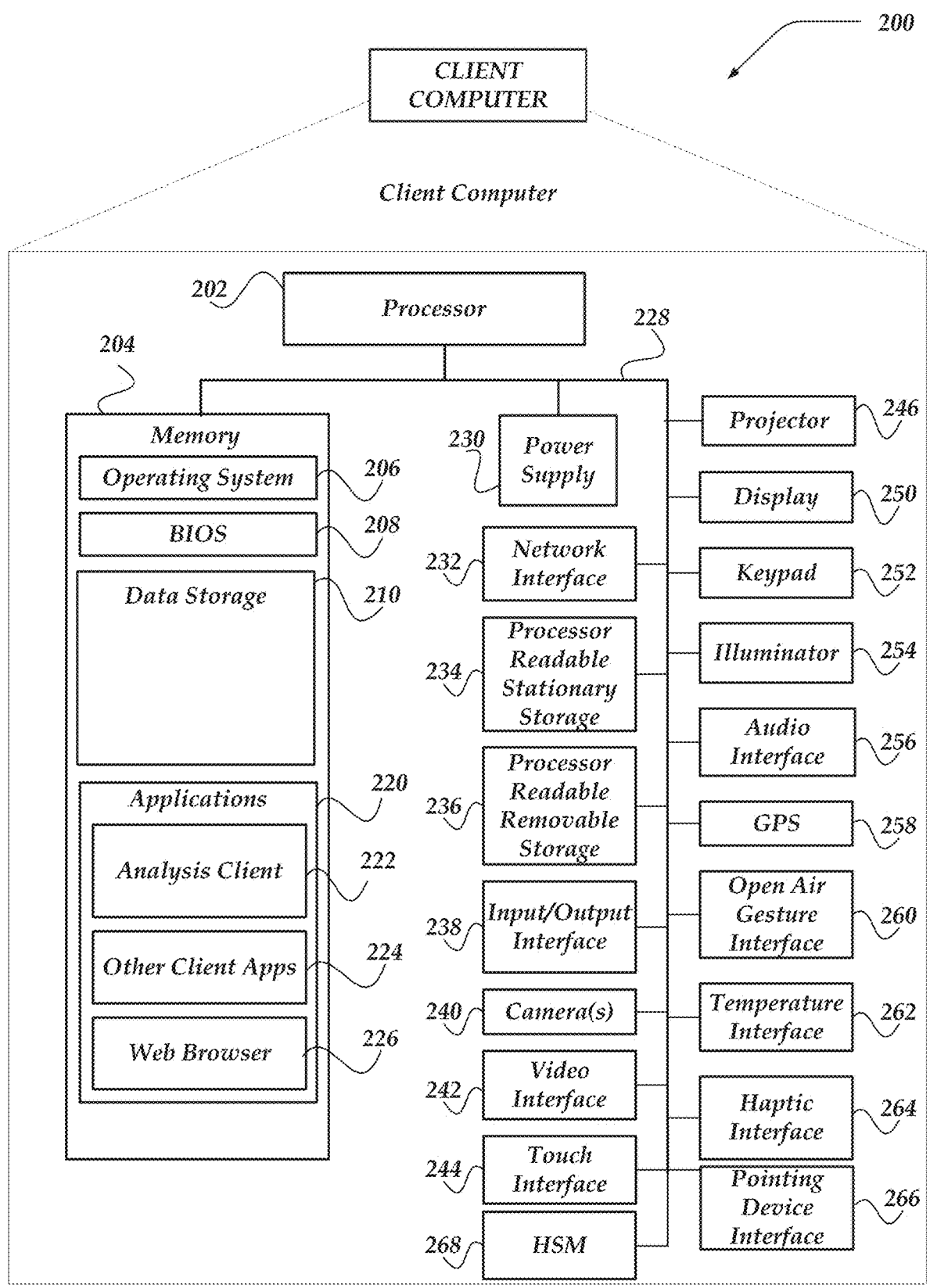
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, speech analysis client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, analysis client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
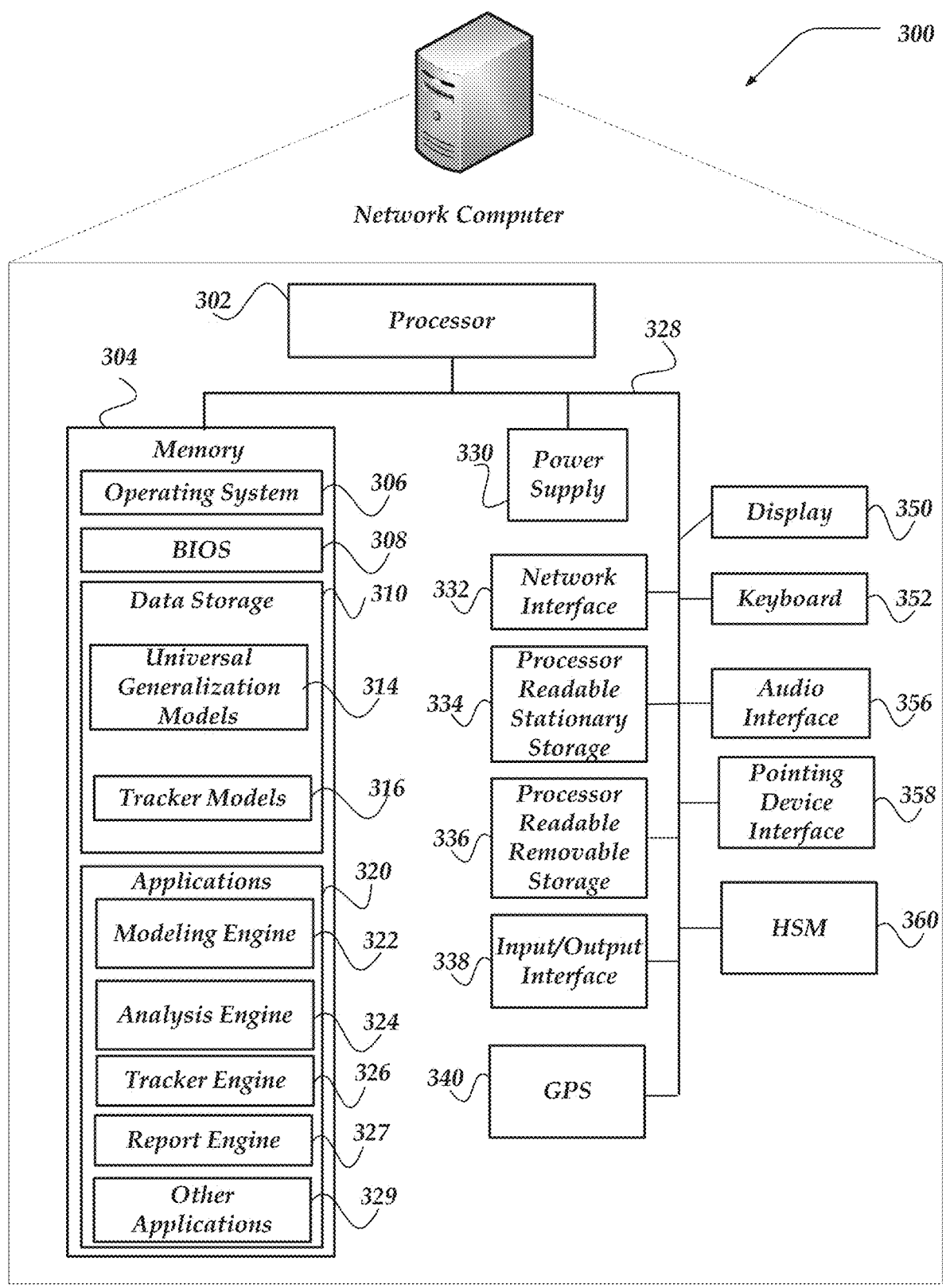
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of speech analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, analysis engine 324, tracker engine 326, report engine 327, other applications 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, universal generalization models 314, tracker models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, analysis engine 324, tracker engine 326, report engine 327, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, analysis engine 324, tracker engine 326, report engine 327, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, analysis engine 324, tracker engine 326, report engine 327, other applications 329, or the like, may be provisioned and de-commissioned automatically.

Also, in one or more of the various embodiments, modeling engine 322, analysis engine 324, tracker engine 326, report engine 327, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing, or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
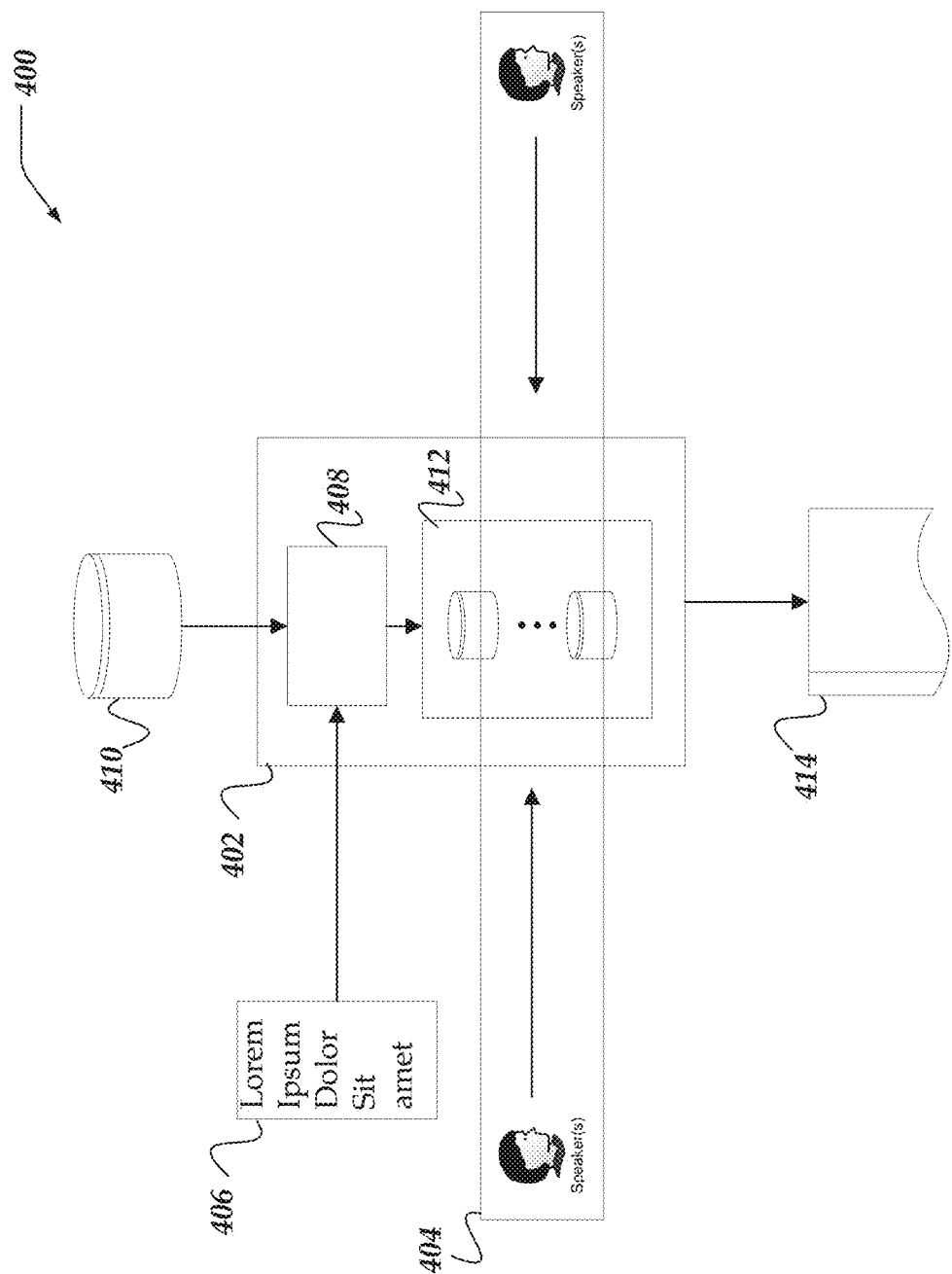
FIG. 4 represents a logical schematic of a system for tracking concepts, topics, or activities in conversations in accord in accord with one or more of the various embodiments.

FIG. 4 represents a logical schematic of system 400 for tracking concepts, topics, or activities in conversations in accord in accord with one or more of the various embodiments. In one or more of the various embodiments, analysis engines, such as, analysis engine 402 may be arranged to employ one or more tracker engines, such as, tracker engine 408 may be arranged to accept multi-channel or multi-modal conversation streams, such as, conversation stream 404. In some embodiments, conversation stream 404 may be a recorded audio or video file that may be processed after the conversation has concluded. In some embodiments, conversation streams, such as, conversation stream 404 may be real-time streams of audio or video provided as a conversation is happening. Also, in some embodiments, conversation streams may include other forms of conversation, such as, chats, email, text messages, or the like.

In one or more of the various embodiments, audio streams provided via conversation stream 404 may be converted into text. In some embodiments, a speech analysis platform may be arranged to employ conventional or customized speech-to-text facilities to convert audio conversation streams into text suitable for additional processing. In some embodiments, the text version of the conversation may be associated with index, timestamps, or counter values that may correspond to the timeline of the conversation. Thus, in some embodiments, speech analysis platforms may be enabled to associate various words with the time they appeared in the audio stream or the conversation timeline. In this example, conversation stream 404 represents a conversation between two or more speakers.

In one or more of the various embodiments, one or more tracker vocabularies, such as, tracker vocabulary 406 may be provided to tracker engine 402. In some embodiments, tracker vocabularies directed to speech may be collections of words or phrases identified by users, configuration information, or the like. For example, in some embodiments, analysis platforms may be arranged to provide user interfaces that enable users to select or enter the one or more words or phrases for tracker vocabularies. In some embodiments, analysis platforms may be arranged to include one or more predefined tracker vocabularies.

Also, in some embodiments, tracker vocabularies directed to tracking the occurrence of specific sounds or audio features may be comprised of one or more audio samples. Likewise, tracker vocabularies directed to tracking the occurrence of various actions, gestures, behavior, or the like, may be comprised of one or more video samples.

In one or more of the various embodiments, tracker vocabularies may correspond set of concepts or topics that a tracker engine may track within a conversation stream. Accordingly, in some embodiments, tracker vocabularies may be comprised of words or phrases that may be related to particular concepts, semantics, or topics of interest. In some embodiments, tracker vocabularies may be comprised of a few words or phrases that may be representative of the topics, semantics, or topics of interest rather than being a comprehensive collection of words or phrases.

Similarly, in some embodiments, tracker vocabularies directed to audio signals may correspond to noises, or the like, that may be related. For example, a tracker vocabulary may be directed to tracking potentially distracting noises, such as, dog barks, vehicle horns, airplane noise, ringing telephones, or the like.

In one or more of the various embodiments, tracker vocabularies, such as, tracker vocabulary 406 may be provided to tracker engine 408. In some embodiments, tracker engines, such as, tracker engine 408 may be arranged to generate tracker models, such as, tracker models 412 from tracker vocabularies. In some embodiments, tracker engines may be arranged to provide tracker vocabularies to a universal generalization model, such as, universal generalization model 410 to generate one or more tracker models.

In one or more of the various embodiments, universal generalization models may be machine learning models that may be trained to predict a generalized vocabulary from the specific samples included in tracker vocabularies. Accordingly, in some embodiments, a generalized vocabulary may be considered an expanded vocabulary based on a tracker vocabulary. For example, tracker vocabulary 406 may include three or four words or phrases centered around a topic while its corresponding generalized vocabulary may include many more words or phrases that may be associated with the same topic represented by the tracker vocabulary. Similarly, a tracker vocabulary that include an audio sample of a dog barking may have a corresponding generalized vocabulary that includes a wide variety of different dog barking sounds.

In some embodiments, tracker vocabulary may be comprised video samples that capture one or more actions (or behaviors) of interest. For example, video clips of actions, such as, screen sharing in video meetings, eye tracking, hand gestures of persons in a video stream, open/closing doors, lights turning on/off, or the like. Accordingly, in some embodiments, modeling engines may be provided video clips that may be provided to video-centric universal generalization models. In some embodiments, analysis platforms may provide one or more universal generalization models for different types of video activity. For example, an analysis platform may be arranged to include a universal generalization model for gestures and a different universal generalization model for tracking screen sharing activity.

Also, in some embodiments, similar to tracking text, sounds, video activity, or the like, analysis engines may be arranged to enable users to generate tracker models for tracking spatial information provided by conversation streams comprised of Virtual Reality (VR) or Augmented Reality (AR) content. For example, spatial information associated with the position of objects, user avatars, or the like.

In one or more of the various embodiments, tracker engines may be arranged to generate tracker models based on the portions of the universal generalization model that may be activated by the tracker vocabulary. In some embodiments, tracker models may be arranged to generate a match score that represents if portions of a conversation stream match the generalized vocabulary that corresponds to the tracker vocabulary used to generate the tracker model. Accordingly, in some embodiments, tracker models may be specialized for the tracker vocabulary used to generate them.

In some embodiments, the specialization of tracker models may enable them to be highly performant as compared to universal generalization models or other comprehensive matching models. For example, in some embodiments, tracker models may be measured in kilobytes while universal generalization models may be measured in gigabytes. Likewise, in some embodiments, tracker models may be highly responsive (e.g., low latency) because of the small size and specialization as compared to universal generalization models or other conventional machine learning models. Further, the small size of tracker model enables tracker engines to keep them in fast local memory or caches whereas comprehensive tracking models, such as, a universal generalization model may be prohibitively large to store in cache memory.

Accordingly, in some embodiments, conversation stream 404 may be provided to tracker models 412 to determine if one or more portions of the conversation match the tracker models. In some embodiments, tracker engines may be arranged to collect a variety of tracker metrics, such as, tracker metrics 414. In some embodiments, tracker metrics may include timestamps in conversations where matches occurred, measures of the proportion of conversation that matched one or more tracker models, counting/measuring matches for different speakers in the conversation, or the like. In some embodiments, tracking engines may be arranged to correlate metrics across more than one tracker model, including tracker models generated from different universal generalization models for different modalities. In some embodiments, tracker engines may be arranged to employ rules, instructions, or the like, provided by configuration information to determine the specific tracker metrics that may be collected.

In one or more of the various embodiments, tracker engines may be arranged to provide tracker metrics to other processes or services that may be arranged to perform various actions. For example, in some embodiments, a speech analysis engine may be configured to automatically generate notifications or events if portions of a conversation in a conversation stream match one or more tracker models. Likewise, for example, tracker engines may be arranged to generate reports in the form of log files, user interfaces, dashboards, or the like, that may provide real-time feedback regarding the occurrence of speech that matches one or more tracker models.

In one or more of the various embodiments, tracker metrics provided by tracker engines may enable organizations to evaluate one or more important conversations for quality control, insight capturing, or the like.

In conventional systems, one of the biggest challenges of using tracking is the limitation of matching only exact phrases or key words whereas in natural human conversations, speakers may be talking about the same thing but may not be using the same phrases or key words. For example, "I don't have any money" may be contextually similar to "I ran out of budget" as both represent similar inherent meaning.

Accordingly, in one or more of the various embodiments, tracker engines may be arranged to employ tracker models to simplify the selection of tracker vocabularies by reading into contexts and returning messages that may be related to words or phrases included in the tracker vocabulary. Further, by providing a wide variety of tracker metrics associated with the tracker model matches in the conversation streams organizations or user may develop insights that may identify process improvements and strategies that align with your business goals.

For example, for some embodiments, Sandra may be the training head of the Sales team in her company. She may use one tracker model to provide tracker metrics that enable her to evaluate how great sales agents start conversations and another tracker model to understand how great sales agents share the pricing details with customers. She then uses insights gained from these tracker models to train other agents. For example, Sandra may use a tracker model to track contextually similar phrases such as: "Thank you for taking some time to speak with me;" "Have you ever noticed;" "Have you ever considered;" or the like.

Also, for example, Tom may be the Chief Quality Assurance Manager and he wants to see how many agents are using negative phrases on customer calls. Accordingly, in this example, Tom may employ a tracker model that is based on tracker vocabulary such as: "I am not interested;" "This makes me uncomfortable;" "Not so good;" "I am skeptical;" "My only problem is;" "My only issue is;" "This does not fit;" or the like.

Also, for example, Samuel may use a tracker model evaluate the dial out calls at his car insurance company. By using a tracker model based on a tracker vocabulary that includes phrases that show buying intent, enquiry about policy options, quotes, discounts, or the like, he may discover how to generate more leads for his business. In this example, such a tracker model may be generated using a tracker vocabulary that includes contextually similar phrases such as: "I need;" "Policy options;" "Require" "Use case;" "Fits our requirement;" "Quotes" "Discounts," or the like.

In one or more of the various embodiments, analysis platforms may be arranged to provide pre-built tracker models that may be associated with one or more concepts or activities. In some embodiments, one or more pre-built tracker models may be collected in libraries or collections that may be directed to different industries or activity categories. In some embodiments, analysis engines may provide one or more tracker model libraries directed to specific categories of activities or conversations, such as, customer service calls, telemedicine, contract negotiations, legal hearings, sales activity, marketing research, or the like. Likewise, in some embodiments, analysis engines may provide one or more tracker model libraries directed to concepts, such as, customer experience, mental health, emotional well-being, or the like.

Accordingly, in some embodiments, pre-built tracker libraries may include one or more tracker models that may be based on tracker vocabularies associated with the concepts or activities the tracker libraries may be directed towards. Thus, in some embodiments, analysis engines may be arranged to provide user interfaces that enable users to select pre-built tracker models rather than requiring users to provide their own tracker vocabularies.

Further, in some embodiments, analysis engines may be arranged to provide user interfaces that enable users to modify tracker vocabulary on demand. For example, if a pre-built tracker model is missing relevant portions of a conversation, a user may add additional tracker vocabulary to track those portions of the conversations that may be missed by the pre-built tracker models. Likewise, in some embodiments, analysis engines may be arranged to enable users to disable tracker vocabulary included in pre-built tracker models.

In some embodiments, analysis engines or modeling engines may be arranged to monitor how users modify pre-built tracker model libraries. In some embodiments, analysis engines may be arranged to collect metrics regarding how often particular tracker vocabulary may be added or disabled. Accordingly, in some embodiments, analysis engines or modeling engines may be arranged to automatically adapt or evolve tracker vocabularies of pre-built tracker model libraries based on user interactions. For example, if the number of users that add the same or similar vocabulary items to a given pre-built tracker model libraries exceed a defined threshold value, the analysis engine may be arranged to automatically include those vocabulary items in the pre-built tracker model libraries. In some embodiments, analysis engines may be arranged to employ one or more rules, instructions, or the like, provided via configuration information to determine if tracker vocabularies for pre-built tracker model libraries may be modified. In some embodiments, analysis engines may be arranged to determine if tracker vocabularies for pre-built tracker model libraries may be modified based on one or more rules, instructions, or the like, provided via configuration information to account for local requirements or local circumstances.

In one or more of the various embodiments, analysis engines may be arranged to provide user interfaces that enable users to interactively generate tracker vocabularies. In some embodiments, one or more user interfaces may enable various type-ahead lookup features to present vocabulary recommendations to users as they are entering or selecting vocabulary for tracker models. In some embodiments, analysis engines may be arranged to determined vocabulary to recommend based on previous selections or previously generated tracker models.

In some embodiments, analysis engines may be arranged to record metrics associated with the selection or generation of tracker models. In some embodiments, analysis engines may be arranged to record how often various vocabularies may be selected for use in the same tracker models. Thus, in some embodiments, analysis engines may be arranged to recommend vocabulary based on the prevalence of being selected with vocabulary the user has explicitly selected for use in their tracker model. Also, in some embodiments, analysis engines may be arranged to enable users to score the quality of tracker models they may employ. These scores may be employed to identify similarity or difference among high scoring tracker models or poor scoring tracker models.

Further, in some embodiments, analysis engines may be arranged to recommend tracker vocabulary based on the personal usage history of the user. For example, as users provide or select tracker vocabulary, modeling engines may automatically suggest other vocabulary that the user has selected for previous conversations.

Also, in some embodiments, analysis engines or modeling engines may be arranged to provide a plug-in architecture or dynamic libraries to enable support for different types of modeling, additional modalities, or the like.

Figure 5:
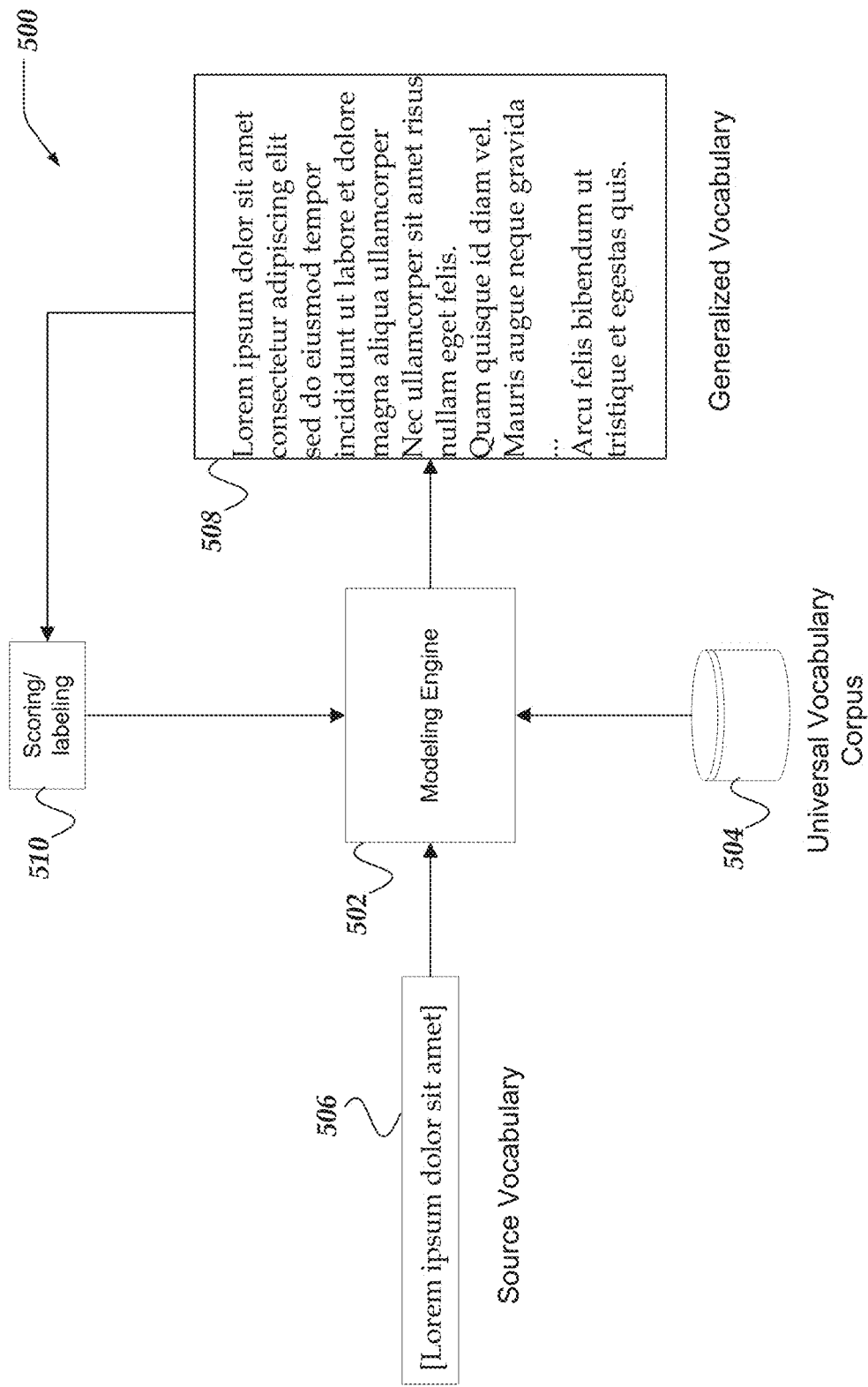
FIG. 5 illustrates a logical schematic of a system for providing universal generalization models for tracking concepts, topics, or activities in conversations in accordance with one or more of the various embodiments.

FIG. 5 illustrates a logical schematic of system 500 for providing universal generalization models for tracking specialized concepts, topics. and activities in conversations in accordance with one or more of the various embodiments. In one or more of the various embodiments, universal generalization models may be deep learning artificial neural networks trained to predict a larger/broader generalized vocabulary from a smaller source vocabulary. In some embodiments, a generalized vocabulary may be considered an expanded vocabulary based on one or more items in a source vocabulary.

In one or more of the various embodiments, modeling engines, such as modeling engine 506 may be arranged to provide a machine learning training platform to train or maintain universal generalization models that predict generalized vocabularies, such as, generalized vocabulary 508 based on source vocabularies, such as, source vocabulary 506. In some embodiments, universal generalization models may be trained using a universal vocabulary corpus, such as, universal vocabulary corpus 504. For example, in some embodiments, in-training universal generalization models may be arranged to select/predict generalized vocabularies for provided source vocabularies.

In one or more of the various embodiments, modeling engines may be arranged to enable predicted generalized vocabularies to be scored or labeled to facilitate the learning of the in-training universal generalization model. In some embodiments, conventional machine learning training methods may be employed to train universal generalization models.

Accordingly, in some embodiments, if a universal generalization model is deemed sufficiently trained at predicting generalized vocabularies from source vocabularies, the universal generalization model may be deployed into a production environment for tracking concepts, topics, or activities in conversations. Note, one or ordinary skill in the art will appreciate the determining the meaning of 'sufficiently trained' may vary depending on local requirement or local circumstances. For example, trainers could be enable to score the quality of the generalized vocabularies predicted by a universal model, if average scores of the predicted vocabularies exceeds a threshold value, the corresponding universal model may be considered to be trained.

As mentioned above, universal generalization models may be generated for various modalities of stream inputs, including audio, video, spatial information, or the like, rather than being limited to conversation speech. Accordingly, in the context of non-speech modalities, source vocabulary may include audio samples, video samples, or the like, rather than being limited to words. For brevity and clarity, conversational speech is used herein as the primary example. But one of ordinary skill in the art will appreciate the trackers vocabularies, tracker models, universal generalization models, and so on, may be created to support other modalities, such as, audio, video, spatial information, or the like.

Figure 6:
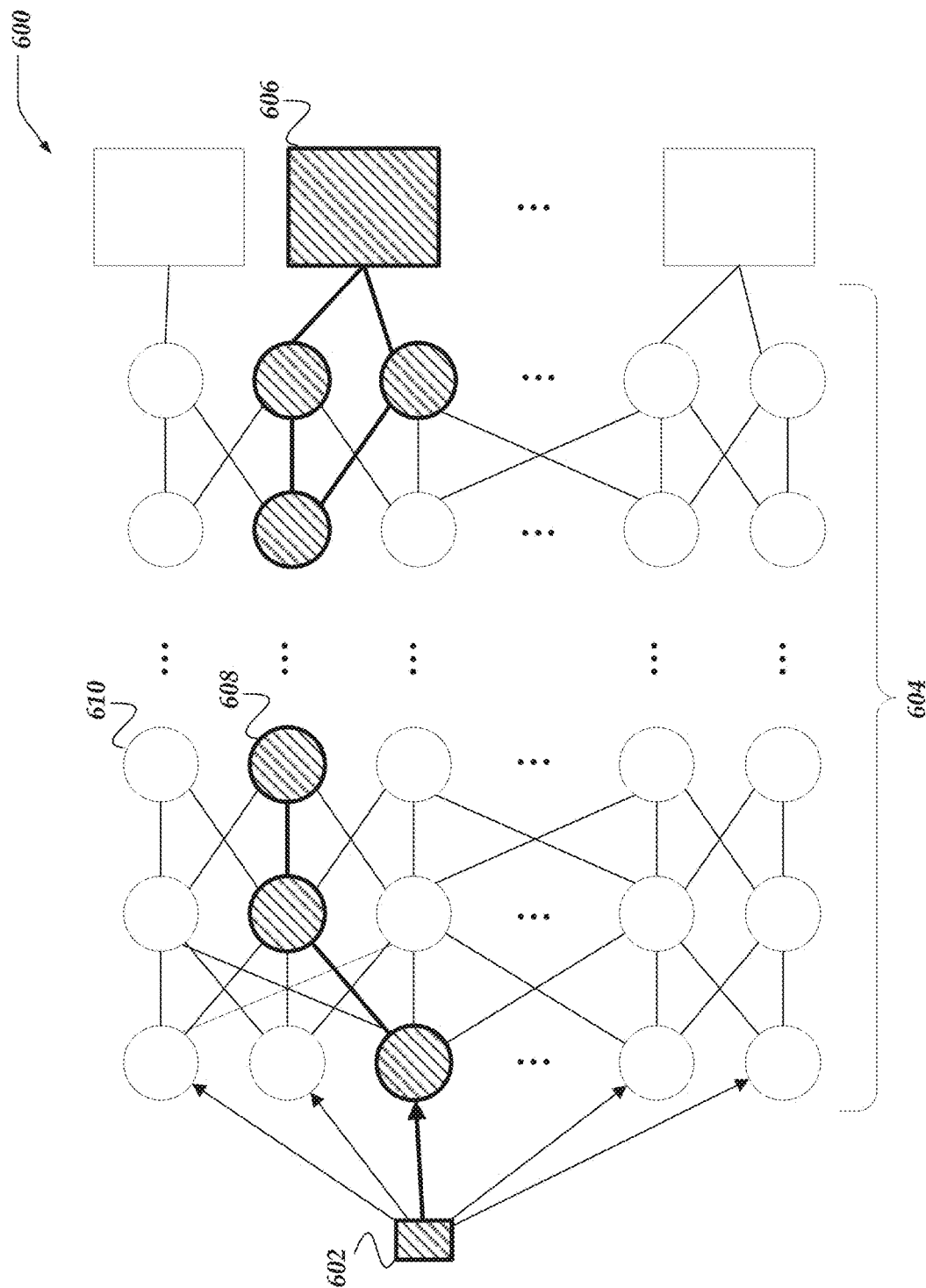
FIG. 6 illustrates a logical architecture of a system for tracking concepts, topics, or activities in conversations in accordance with one or more of the various embodiments.

FIG. 6 illustrates a logical architecture of system 600 for tracking concepts, topics, or activities in conversations in accordance with one or more of the various embodiments. As described above, universal generalization models may be trained to predict generalized vocabularies based on source vocabularies.

Accordingly, tracker vocabularies, such as, tracker vocabulary 602 may be provided to universal generalization models, such as, universal generalization model 604, to predict/select generalized vocabularies, such as, generalized vocabulary 606 that may correspond to the provided tracker vocabulary.

In one or more of the various embodiments, universal generalization model 606 may be a deep learning artificial neural network trained to predict a generalization vocabulary for a given tracker vocabulary. Accordingly, in some embodiments, tracker engines may be arranged to identify the one or more portions or the universal generalization model that significantly participated in the determination of the generalized vocabulary. For example, in some embodiments, tracker engines may be arranged to select portions of universal generalization models based on determining the artificial neurons in the artificial neural network that were activated to predict the generalized vocabulary for a tracker vocabulary. In some embodiments, tracker engines may be arranged to partition a universal generalization model based on a proportion of artificial neurons that were activity while predicting the generalized vocabulary.

In this example, for some embodiments, the tracker engine provides tracker vocabulary 602 to universal generalization model 604 to predict generalized vocabulary 606 for tracker vocabulary 602. Accordingly, in some embodiments, the tracker engine may determine one or more portions of universal generalization model that were involved in the determination of generalized vocabulary 606. In this example, shaded neuron nodes, such as, node 608 represent neurons that were determined to be active in the prediction of generalized vocabulary 606. Likewise, unshaded neuron nodes, such as, neuron node 610 may be considered to be uninvolved with the prediction of generalized vocabulary 606. Note, in some embodiments, activation functions associated with neuron nodes in universal generalization models may be continuous such that a minimum threshold activation score may be defined to determine if neuron nodes should be considered to activated for a given generalized vocabulary prediction.

In some embodiments, tracker engines may be arranged to generate tracker models based on the portions of a universal generalization model that were determined to be activated for a given tracker vocabulary. Thus, in some embodiments, the tracker model may be a specialized detector/classifier narrowly focused to predict (e.g., via a match score) if portions of a conversation are predicted to be part of the generalized vocabulary of a tracker vocabulary.

Accordingly, in some embodiments, if a tracker vocabulary is provided, the tracker engines may submit the tracker vocabulary to the universal generalization model to determine the one or more portions of the universal generalization model that were activated. In some embodiments, the activated portions of the universal generalization model may be employed to generate tracker models that may be used for real-time tracking of vocabulary items (e.g., words, sounds, gestures, or the like) in conversations that match the tracker models. Accordingly, rather than employing disadvantageously large or disadvantageously slow performing universal generalization models or other comprehensive tracking models to track tracker vocabulary in a conversation, the specialized tracker models may be employed, enabling tracker metrics to be produced in the real-time.

Further, in one or more of the various embodiments, tracker engines may be arranged to support more than one tracker model at the same time each generated from the same universal generalization model. For example, tracker vocabulary A may be provided to generate tracker model A and tracker vocabulary B may be provided to generate tracker model B. And, in this example, both tracker model A and tracker model B may be employed to generate independent tracker metrics for each individual tracker model.

Figure 7:
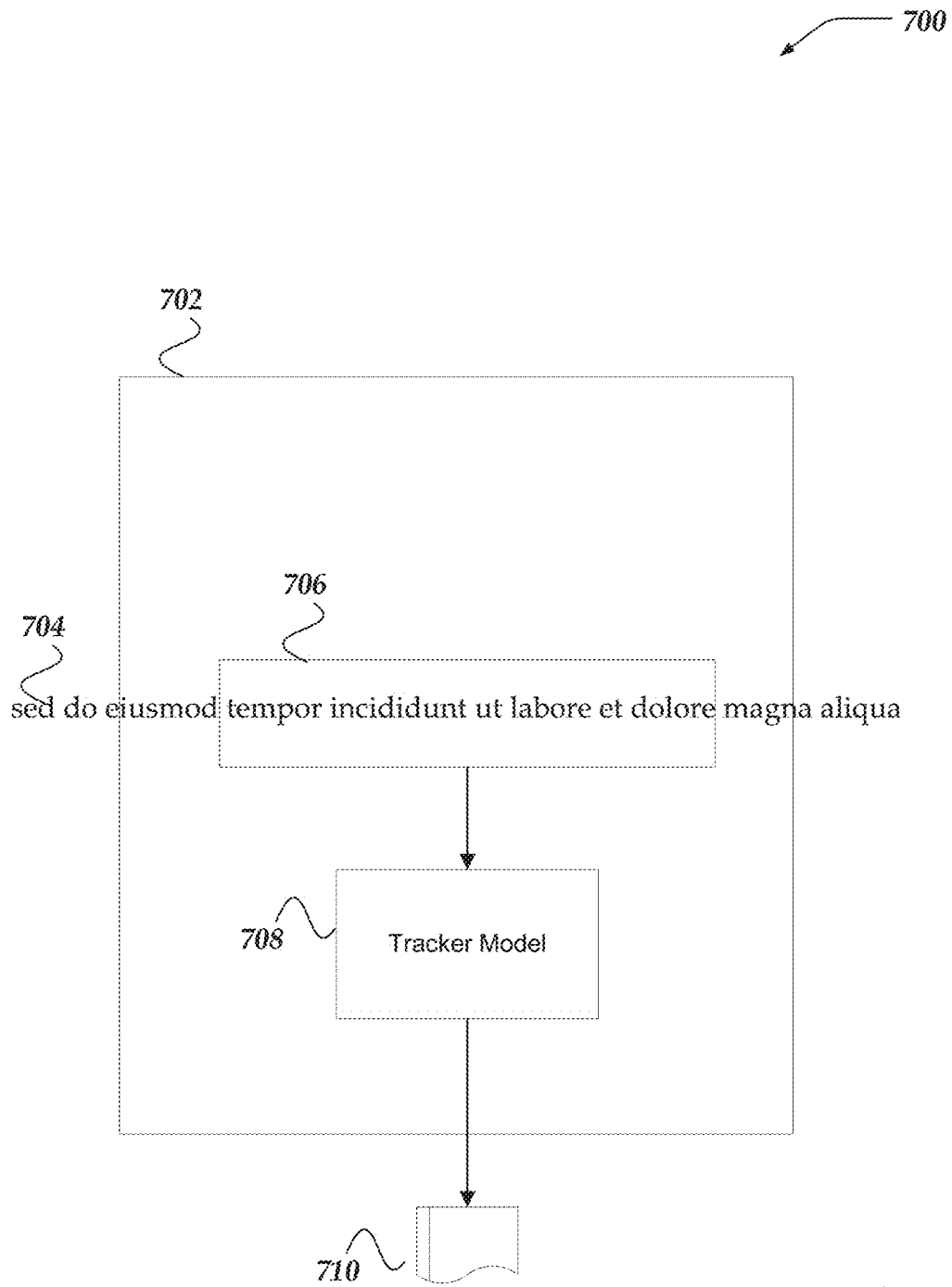
FIG. 7 illustrates a logical schematic of a system for tracking concepts, topics, or activities in conversations in accordance with one or more of the various embodiments.

FIG. 7 illustrates a logical schematic of system 700 for tracking concepts, topics, or activities in conversations in accordance with one or more of the various embodiments. In one or more of the various embodiments, system 700 may be arranged to include tracker engine 702 that may be provided conversation stream 704 in real-time or from a prerecorded source.

Accordingly, in some embodiments, tracker engine 702 may be arranged to collect words or phrases as they may be provided by conversation stream 704. In one or more of the various embodiments, tracker engines may be arranged to employ a sliding window, such as, window 706 to determine if words or phrases should be provided to a tracker model for evaluation. In some embodiments, sliding windows, such as, window 706 may be arranged to collect a defined number of words that once collected may be provided to a tracker model for evaluation.

In one or more of the various embodiments, tracker engines may be arranged to determine the size of sliding windows based on tracker vocabulary and generalized vocabulary that correspond to a tracker model. In some embodiments, tracker engines may be arranged to set the size of sliding windows based on the length of phrases in the tracker vocabulary and the length of phrases in the generalized vocabulary corresponding to the tracker vocabulary. In some embodiments, tracker engines may be arranged to determine sliding window size based on the average length of phrases in the tracker vocabulary and the generalized vocabulary. In some embodiments, tracker engines may be configured to employ rules, instructions, or the like, for determining sliding window size that may be provided via configuration information to account for local requirements or local circumstances.

For example, in some embodiments, tracker engines may be configured to progressively adjust sliding window sizes based on match results. For example, a tracker engine may be configured automatically increase or decrease the sliding window size to identify sizes that may be more effective or efficient for a given tracker model. Also, for example, a sliding window may initially be set to one word, then the tracker engine may increment the size of the sliding window, monitoring the effect on match results.

For example, for some embodiments, if tracker model A is based on a tracker vocabulary includes phrases with an average length of five words and the corresponding generalized vocabulary includes phrases with an average of four phrases, submitting one word at a time to the tracker model may be inefficient or wasteful because in this example it may be unlikely that a single word may provide a match. In contrast, in this example, submitting three to five words at time may provide more matches and less wasteful submissions. Note, in some embodiments, tracker engines may be arranged to employ other features of the tracker vocabulary or generalized vocabulary to determine sliding window size, including minimum word count phrases, maximum word count of phrases, or the like.

In some embodiments, tracker engines may be arranged to generate match score, such as, match score 710 that indicates if the words/phrases in the sliding window matched the tracker model. In some embodiments, the match score may be real number value representing the closeness or confidence the match. Also, in some embodiments, the match score may be discrete values representing match or non-match. Further, in some embodiments, tracker engines may be arranged to provide a match score that includes more than one value or component, including match/non-match, confidence score, or the like.

As mentioned above, conversation streams may include audio, video, spatial information (from VR/AR environments) rather than a stream of text. Accordingly, similar to processing text-based streams, tracking engines may be arranged to employ sliding windows to capture a portion of the incoming stream that may be provided to tracking models. For example, sliding windows may be based on a time duration, amount of data, or the like, rather than word counts. Also, in some embodiments, conversation streams that may be audio or video may be provided using audio or video protocols that provide frames, sync markers, counters, or the like, that may be used for defining sliding windows.

Generalized Operations

FIGS. 8-11 represent generalized operations for tracking concepts, topics, or activities in conversations in accordance with one or more of the various embodiments. In one or more of the various embodiments, processes 800, 900, 1000, and 1100 described in conjunction with FIGS. 8-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-11 may be used for tracking concepts, topics, or activities in conversations in accordance with at least one of the various embodiments or architectures such as those described in conjunction with FIGS. 4-7. Further, in one or more of the various embodiments, some or all of the actions performed by processes 800, 900, 1000, and 1100 may be executed in part by modeling engine 322, analysis engine 324, tracker engine 326, report engine 327, or the like, by one or more processors of one or more network computers.

Figure 8:
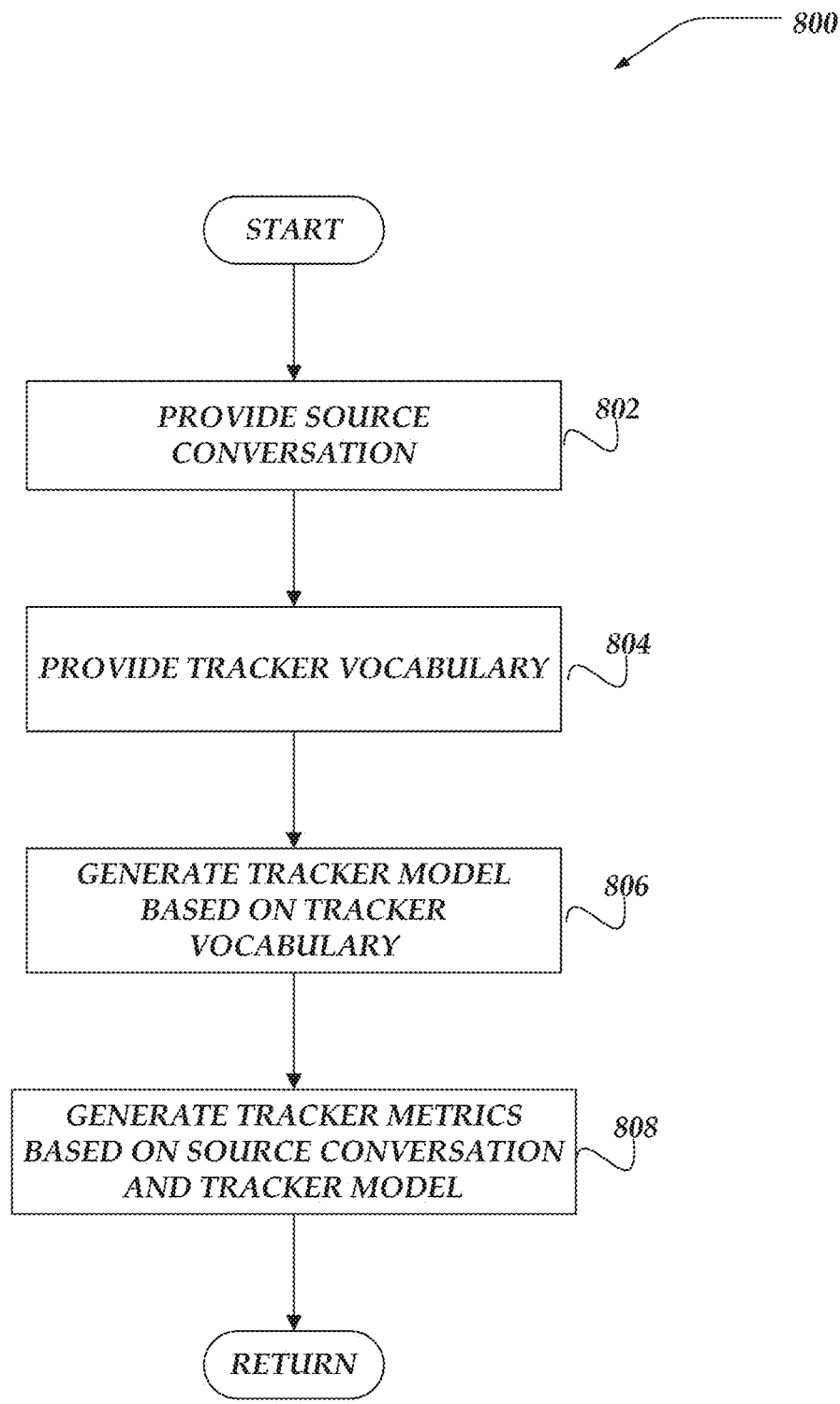
FIG. 8 illustrates an overview flowchart for a process for tracking concepts, topics, or activities in conversations in accordance with one or more of the various embodiments.

FIG. 8 illustrates an overview flowchart for process 800 for tracking concepts, topics, or activities in conversations in accordance with one or more of the various embodiments. After a start block, at block 802, in one or more of the various embodiments, a source conversation may be provided to a tracker engine. In one or more of the various embodiments, a source conversation may be provided from a real-time audio stream of an ongoing conversation, meeting or presentation. In some cases, source conversations may include two or more persons. In other cases, source conversations may be one or more persons presenting or otherwise speaking to an audience. Also, in some embodiments, the source conversation may be provided via a recording of the conversation.

In one or more of the various embodiments, source conversations may be processed in real-time or in-advance to generate text from audio streams. In some embodiments, the speech-to-text processing may be performed by a third-party/external service. Also, in some embodiments, speech analysis engines may be arranged to execute one or more conventional or non-conventional speech-to-text processing techniques to convert audio streams of conversations into text before the conversation stream may be provided to a tracker engine.

In one or more of the various embodiments, analysis engines or tracker engines may be arranged to process text-based conversations word-by-word, sentence-by-sentence, paragraph-by-paragraph (snippets), or the like. In some embodiments, conversations may be provided with additional meta-data, including, timestamp/time-line markers, channel markers, vertical sync indicators, references or identifiers to portions/locations in the source stream, or the like. Also, in some embodiments, conversation words may be provided as a stream of text words. In some embodiments, conversation meta-data may include tags or markers that indicate conversational whitespace, such as, quiet periods, stops, starts, dead-air, or the like.

In some embodiments, text-based conversations may be considered to be text that has been generated from audio streams or video stream using a text-to-speech process, service, or the like. Also, in some embodiments, conversations may be provided from other conversation sources, such as, text chats, email, online forum posts/comments, or the like.

At block 804, in one or more of the various embodiments, one or more tracker vocabularies may be provided to tracker engines. In one or more of the various embodiments, tracker engines may be arranged to provide one or more user interfaces, or the like, that enable users or administrators to supply words or phrases, audio samples, video samples, that may be related to a topic, sentiment, or activity they are interested in tracking in the conversation.

In some embodiments, one or more tracker vocabularies may be pre-defined or otherwise supplied via configuration information. In some embodiments, predefined tracker vocabularies may be related to topics the application developer may be interested in tracking as a feature of their application.

In one or more of the various embodiments, in addition to user interfaces, tracker engines may be arranged to provide one or more APIs that enable other applications or services to communicate tracker vocabularies to tracker engines.

At block 806, in one or more of the various embodiments, tracker engines may be arranged to generate one or more tracker models based on the one or more tracker vocabularies. In one or more of the various embodiments, tracker engines may be arranged to generate tracker models that may be focused on the tracker vocabulary. In some embodiments, tracker models may be generated based on providing the tracker vocabularies to universal generalization models. Accordingly, in some embodiments, the one or more portions of the universal generalization models that may be activated by the tracker vocabulary may be determined. Thus, in some embodiments, the determined portions of the universal generalization model may be employed to generate the tracker model. In some embodiments, this may provide tracker models that are much smaller than the universal generalization model they may have been derived from. Accordingly, in some embodiments, employing tracker models provide performance improvements related to reduced memory footprint as well as fast response.

At block 808, in one or more of the various embodiments, tracker engines may be arranged to generate tracker metrics based on the source conversation and the one or more tracker models.

In one or more of the various embodiments, tracker metrics may be metrics associated with the conversation stream and the occurrence of words or phrases, sounds, actions, images, or the like, that match tracker models. In one or more of the various embodiments, a wide-variety of metrics may be generated to provide insights into the occurrence of speech related to the topics/sentiments associated with the tracker models. Likewise, metrics associated with the occurrence of tracked sounds or actions may be collected. In some embodiments, tracker engines may be arranged to correlated metrics from different tracker models with each other or the conversation stream.

Next, in one or more of the various embodiments, control may be returned to a calling process.

Figure 9:
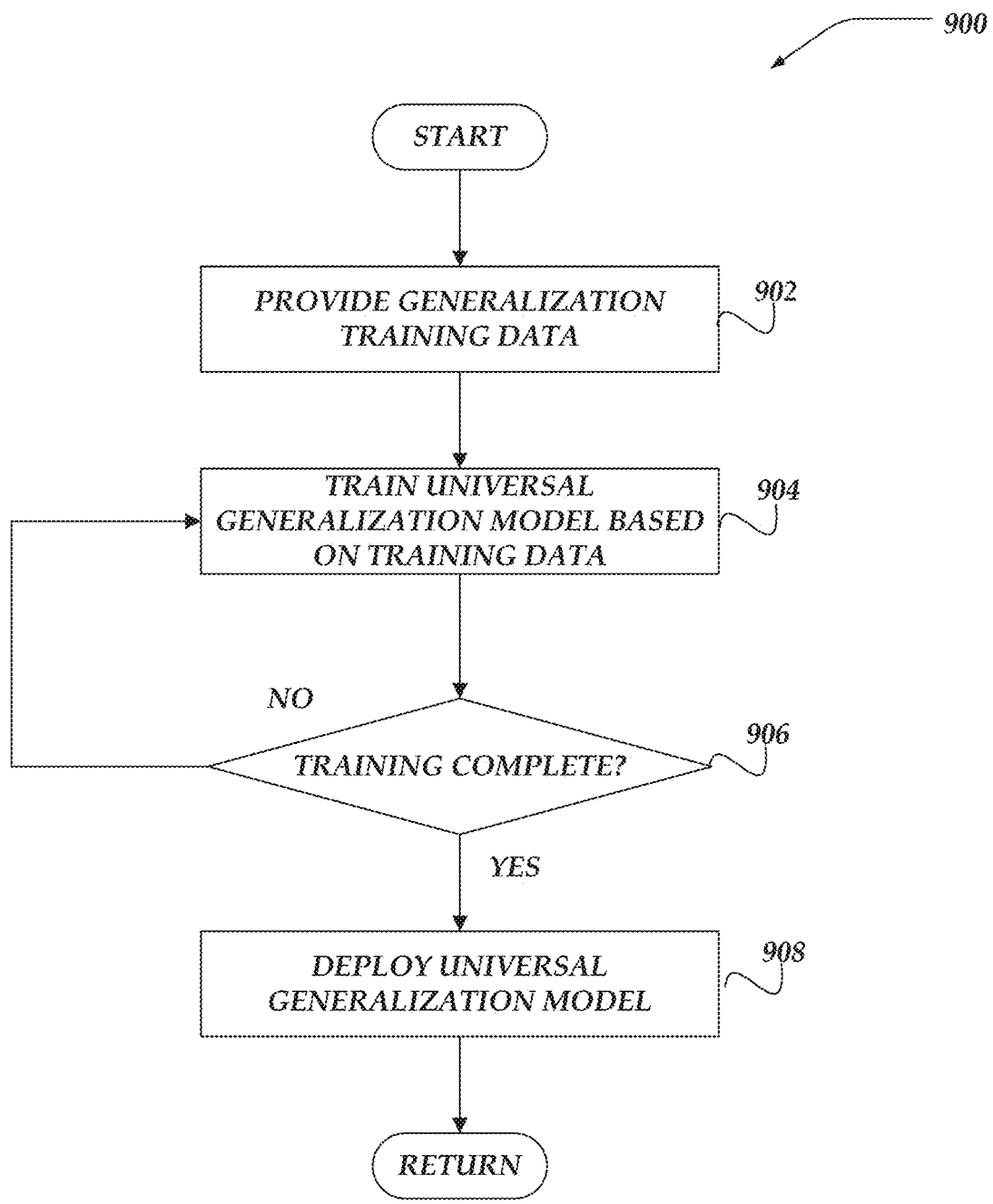
FIG. 9 illustrates a flowchart for a process for generating universal generalization models for tracking concepts, topics, or activities in conversations in accordance with one or more of the various embodiments.

FIG. 9 illustrates a flowchart for process 900 for generating universal generalization models for tracking concepts, topics, or activities in conversations in accordance with one or more of the various embodiments. After a start block, at block 902, in one or more of the various embodiments, generalization training data may be provided to a modeling engine. As described above, universal generalization models may be trained to predict large or expanded generalized vocabularies that maintain the same meaning, usage, sentiment, or the like, as small source vocabularies.

In some embodiments, training data for training universal generalization models may vary depending on which modality (e.g., text, audio, video, spatial) the universal model may be directed towards. Accordingly, in some embodiments, training data sets for training text focused universal generalization models may include millions of words, phrases, or vocabularies may be provided. Also, in some embodiments, modeling engines may be arranged to generate one or more universal generalization models that may be focused on particular industries or activities (e.g., medicine, legal, customer service, education, or the like). Also, in some embodiments, modeling engines may be arranged to generate one or more universal generalization models that may be focused on different spoken languages.

At block 904, in one or more of the various embodiments, the modeling engine may be arranged to train a universal generalization model based on the generalized training data. As described above, modeling engines, or the like, may be arranged to enable one or more conventional prediction/labeling/scoring training methods that enable the universal generalization model to be trained to predict generalized vocabularies from smaller source vocabularies, such as, tracker vocabularies.

In one or more of the various embodiments, training goals for training universal generalization models may include that given a small vocabulary it can successfully predict a generalized vocabulary that remains consistent in meaning, usage, or sentiment with the small source vocabulary.

At decision block 906, in one or more of the various embodiments, if the training of the universal generalization model may be complete, control may flow to block 908; otherwise, control may loop back to block 904.

In one or more of the various embodiments, one or more conventional training/testing cycles may be performed until the universal generalization model has converged on a desired prediction quality/accuracy. Note, the training/testing actions for training the universal generalization model may vary depending on the model type of the universal generalization model. One of ordinary skill in the art will appreciate how to evaluate if the universal generalization model has converged sufficiently for tracking concepts, topics, or activities in conversations. For example, in some embodiments, modeling engines may be arranged to employ rules, threshold values, instructions, or the like, provided via configuration information to determine if the universal generalization model is sufficiently trained.

At block 908, in one or more of the various embodiments, the modeling engine may deploy the trained universal generalization model for use by tracker engines.

In one or more of the various embodiments, tracker engines or modeling engines may be arranged to periodically or occasionally update or re-train universal generalization models depending on various circumstances. For example, if a new or additional training data may be provided, the universal generalization model may be retrained using the new/additional training data. Likewise, in some embodiments, one or more conversation domains may be significantly divergent that additional or specialized training may be desirable to improve the effectiveness of the universal generalization models. For example, a universal generalization model training for general purpose conversation stream may be less effective processing conversation streams for specialized domains, such as, medicine, law, biology, physics, or the like. Accordingly, in one or more of the various embodiments, additional specialized universal generalization models may be generated. Or, in some embodiments, a single universal generalization model may be further trained with training data that includes the specialized vocabularies of interest. Note, while adding more vocabulary to universal generalization models may increase the size or resource consumption of universal generalization models, the tracker models generated from even larger universal generalization models may remain efficient for real-time use because while the universal generalization model may be increasingly large as it is trained to support more vocabulary, the size of tracker model used for real-time matching may remain small.

Next, in one or more of the various embodiments, control may be returned to a calling process.

Figure 10:
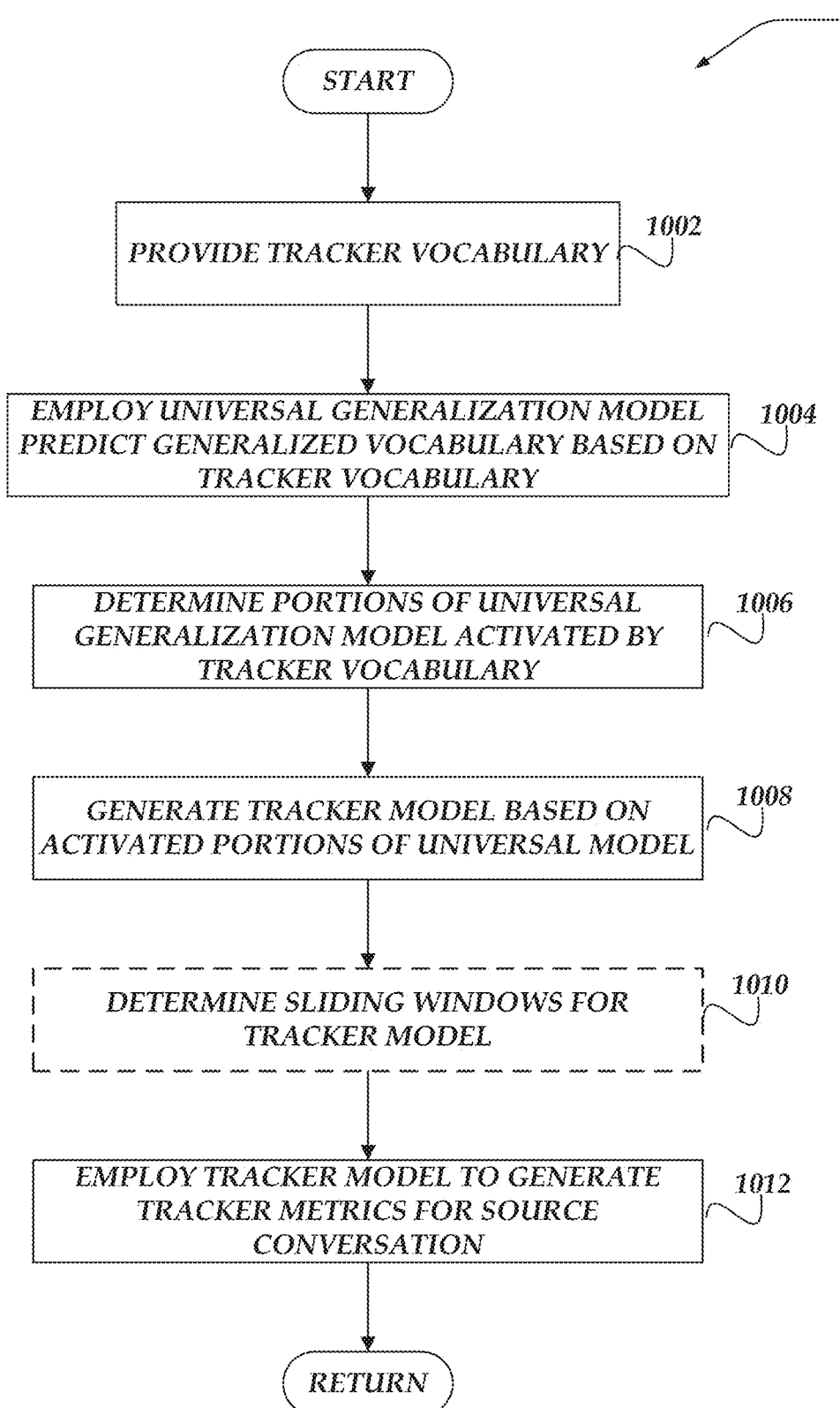
FIG. 10 illustrates a flowchart for a process for generating tracker metrics for tracking concepts, topics, or activities in conversations in accordance with one or more of the various embodiments.

FIG. 10 illustrates a flowchart for process 1000 for generating tracker metrics for tracking concepts, topics, or activities in conversations in accordance with one or more of the various embodiments. After a start block, at block 1002, in one or more of the various embodiments, one or more tracker vocabularies may be provided to a tracker engine. In one or more of the various embodiments, tracker vocabularies may be selected by users via one or more user interfaces or configuration information. In some embodiments, tracker engines may be arranged to enable users to select tracker vocabulary on the fly. Or, in some cases, tracker engines may be arranged to enable users to update existing tracker vocabularies on-the fly or otherwise.

In one or more of the various embodiments, tracker vocabularies may include one or more vocabulary items that represent a concept, meaning, sentiment, activity, or the like, to the user providing the tracker vocabularies.

At block 1004, in one or more of the various embodiments, the tracker engine may be arranged to employ a universal generalization model to predict one or more generalized vocabularies based on the one or more tracker vocabularies. As described above, in some embodiments, universal generalization model may be machine learning models, such as, deep learning artificial neural networks, that are trained or configured to match tracker vocabularies with generalized vocabularies. In some embodiments, universal generalization models may be referred to a universal model because they are trained to match any given vocabulary set with a more generalized vocabulary. Accordingly, in some embodiments, generating effective universal generalization models may require significant training effort against very large datasets.

Accordingly, in some embodiments, tracker engines may be arranged to submit tracker vocabularies to a universal generalization model that is trained to predict the generalized vocabulary that matches the submitted tracker vocabularies.

At block 1006, in one or more of the various embodiments, the tracker engine may be arranged to determine one or more portions of the universal generalization model that may be activated by the one or more tracker vocabularies. In one or more of the various embodiments, universal generalization model may be trained to enable them to predict generalized vocabulary for any given tracker vocabulary. However, in some embodiments, just a small portion of the large universal generalization model may be involved in predicting generalized vocabularies for a tracker vocabulary. For example, a tracker vocabulary comprising a few words or phrases may activate a small portion of a universal generalization model trained using millions of words or vocabularies.

One of ordinary skill in the art will appreciate that the determination of the activated portions of the universal generalization model may vary depending on the implementation details of the universal generalization model. However, one of ordinary skill in the art will be familiar with determining the activated portions of the universal generalization model having different implementations. For example, in some embodiments, if the universal generalization model is an artificial neural network, it may be comprised of many artificial neuron nodes associated with activation functions that are learned during the training of the model. Thus, for example, observing the performance of the activation functions in the universal generalization model may identify the artificial neurons or groups/layers of artificial neurons that are activated for a given tracker vocabulary.

At block 1008, in one or more of the various embodiments, the tracker engine may be arranged to generate one or more tracker models based on the one or more determined portions of the universal generalization model. In one or more of the various embodiments, tracker models may be arranged to stand alone models that are generated based on the activated portions of the universal generalization model. Accordingly, in some embodiments, tracker models may be considered optimized for matching the tracker vocabulary that was used to determine the activated portions of the universal generalization model.

For example, for some embodiments, if the universal generalization model may be considered a large graph of artificial neural network nodes, the tracker model may be considered a partition of the universal generalization model that includes the neuron nodes from the universal generalization model that were activated by the tracker vocabulary. Likewise, in other embodiments, if the universal generalization model may be implemented using a collection of components, such as, heuristics, sub-models, sub-graphs, layers, trees, random forests, neural networks, decision trees, or the like, the portions of the universal generalization model determined to activate by the tracker vocabulary may be duplicated into a tracker model separate from the universal generalization model.

At block 1010, in one or more of the various embodiments, optionally, the tracker engine may be arranged to determine sliding windows for the one or more tracker models.

In one or more of the various embodiments, tracker engines may be arranged to provide sliding windows of fixed size or variable size. In some embodiments, variable sized sliding windows may be progressively/adaptively modified while a conversation is being processed or the correspondent tracker model is in use.

In some embodiments, the sliding window size for a tracker model may be initially set when the tracker model is generated based on the sizes of the tracker vocabulary or the generalized vocabulary. For example, in some embodiments, tracker engines may be arranged to set sliding window sizes based on the average length of phrases in the tracker vocabulary and the average length of phrases in the corresponding generalized vocabulary. Then, for example, in some embodiments, tracker engines may be configured occasionally decrease or increase the sliding window size and compare the performance (e.g., percentage or rate of matches) of the different sizes. For example, in some embodiments, if the sliding window size for a tracker model is initially four words, but upon observation three word submissions produce more matches than four word submissions, the tracker engines may be configured to decrease the sliding window size.

Also, in some embodiments, tracker engines may be configured initialize sliding window sizes to a lower value (e.g., one word) and increment the size until match rates are above a defined threshold value.

Accordingly, in some embodiments, tracker engines may be arranged to run one or more sliding window experiments in parallel to determine an sliding window size. In some embodiments, tracker engines may be arranged to initiate sliding window experiments periodically or randomly to determine/update sliding window sizes for tracker models.

In one or more of the various embodiments, tracker engines may be arranged to employ sliding window buffers that determine how many words at a time from a conversation stream should be provided to the tracker model.

Also, in some embodiments, tracker engines may be arranged to determine sliding window size for other modalities (e.g., sound, video, spatial information) using characteristics or metrics suitable to the given modality. For example, sliding windows for audio streams may be determined based on time slices, data size, or the like.

Note, this block is indicated as being optional because in some embodiments, tracker engines may be arranged to dynamically or progressively determine sliding window size based on the predictions made while processing conversation streams in real-time.

At block 1012, in one or more of the various embodiments, the tracker engine may be arranged to employ the one or more tracker models to generate one or more tracker metrics for the source conversation streams. In one or more of the various embodiments, tracker engines may be arranged to employ one or more tracker models to generate tracker metrics for a conversation.

In one or more of the various embodiments, one or more tracker models may be provided before a conversation stream may be processed. Also, in some embodiments, one or more tracker models may be provided during the processing of the conversation stream. For example, if a user monitoring a stream notices an interesting topic, the user may introduce a new tracker model based on providing/selecting tracker vocabulary associated with the topic.

In one or more of the various embodiments, tracker engines may be arranged to generate/collect tracker metrics for each tracker model separately as well as each conversation stream separately. However, in some embodiments, tracker engines may be arranged to collect tracker metrics that may be based on of one or more tracker models, such as, aggregates, tracker metrics composed/computed of metrics from multiple tracker models, or the like). Accordingly, in some embodiments, tracker engines may be arranged to employ rules, instructions, or the like, provided via configuration information to determine the collected tracker metrics to account for local circumstances or local requirements.

Next, in one or more of the various embodiments, control may be returned to a calling process.

Figure 11:
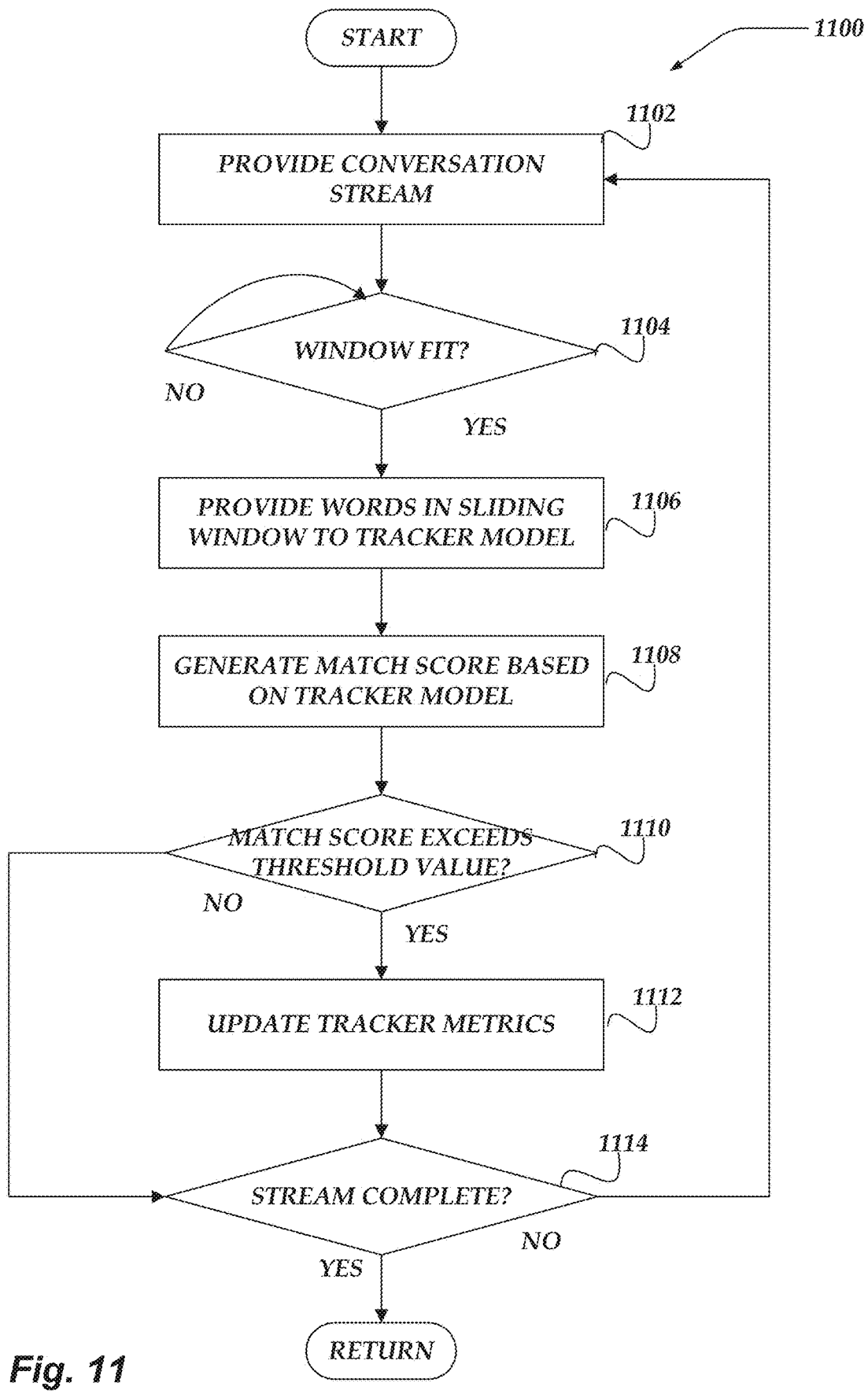
FIG. 11 illustrates a flowchart for a process for tracking concepts, topics, or activities in conversations in accordance with one or more of the various embodiments.

FIG. 11 illustrates a flowchart for process 1100 for tracking concepts, topics, or activities in conversations in accordance with one or more of the various embodiments. In this example, for some embodiments, the conversation and the trackers may be considered text-based. After a start block, at block 1102, in one or more of the various embodiments, a conversation stream may be provided to a tracker engine. As described above, a conversation stream may be provided to a tracker engine. As described above, in some embodiments, audio (e.g., speech) conversation streams may be pre-processed into text comprising individual words that may be provided as a stream of text words.

In one or more of the various embodiments, tracker engines may be arranged to buffer one or more individual words before evaluating them with one or more tracker models. In one or more of the various embodiments, the buffers may be FIFO (first in first out) queues, or the like, that may collect a portion of the conversation stream in the same order the words are spoken or written (in the case of chats or emails). One of ordinary skill in the art will appreciate that these buffers may be referred to as sliding windows because they hold a range of words from the conversation where each range represents the words in the same order they are provided in the conversation stream.

At decision block 1104, in one or more of the various embodiments, if the sliding window of one or more tracker models may be fit or filled, control may flow to block 1106; otherwise, control may loop back to decision block 1104.

In one or more of the various embodiments, tracker engines may be arranged to provide sliding windows of fixed size or variable size. In some embodiments, variable sized sliding windows may be progressively/adaptively modified while a conversation is being processed or the correspondent tracker model is in use.

In some embodiments, the sliding window size for a tracker model may be initially set when the tracker model is generated based on the sizes of the tracker vocabulary or the generalized vocabulary. For example, in some embodiments, tracker engines may be arranged to set sliding window sizes based on the average length of phrases in the tracker vocabulary and the average length of phrases in the corresponding generalized vocabulary. Then, for example, in some embodiments, tracker engines may be configured occasionally decrease or increase the sliding window size and compare the performance (e.g., percentage or rate of matches) of the different sizes. For example, in some embodiments, if the sliding window size for a tracker model is initially four words, but upon observation three word submissions produce more matches than four word submissions, the tracker engines may be configured to decrease the sliding window size.

Also, in some embodiments, tracker engines may be configured initialize sliding window sizes to a lower value (e.g., one word) and increment the size until match rates are above a defined threshold value.

Accordingly, in some embodiments, tracker engines may be arranged to run one or more sliding window experiments in parallel to determine an sliding window size. In some embodiments, tracker engines may be arranged to initiate sliding window experiments periodically or randomly to determine/update sliding window sizes for tracker models.

At block 1106, in one or more of the various embodiments, the tracker engine may be arranged to provide the words in the sliding window to one or more tracker models.

In one or more of the various embodiments, tracker engines may be arranged to transfer or copy to words in the sliding window buffer to tracker model. Note, in some embodiments, one of ordinary skill in the art will appreciate the one or more conventional natural language processing (NLP) operations may be employed to transform the character-based words into one or more binary or numerical representations before submitting the words to tracker model. In some embodiments, tracker engines may be arranged to employ rules, instructions, libraries, or the like, provided via configuration information to account for local requirements, local preferences, local circumstances, or the like. For example, in some embodiments, the data structures employed to implement tracker models may require a specific representation, thus if those data structures are updated or modified (e.g., a different data structure is selected to implement tracker models), the processes for transforming conversation stream words into representation suitable for the tracker model may be modified as well.

Accordingly, in some embodiments, one of ordinary skill in the art will appreciate that the conversation stream words in the sliding window buffer may be transformed to a format or representation suitable for the tracker model before they are submitted to the tracker model for evaluation.

At block 1108, in one or more of the various embodiments, the tracker engine may be arranged to generate one or more match scores for the source vocabulary and the one or more tracker models. As described above, in one or more of the various embodiments, tracker models may be comprised of a portion of a universal generalization model that is optimized for the tracker vocabulary used to define the tracker model. Accordingly, in some embodiments, tracker models may be arranged to generate match score that represents if (or how well) the provided words are in the generalized vocabulary that was predicted for the tracker vocabulary used to generate the tracker model.

At decision block 1110, in one or more of the various embodiments, if the one or more match scores exceed one or more threshold values, control may flow to block 1112; otherwise, control may flow decision block 1114.

In some embodiments, the match score produced by tracker models indicates if the input words are predicted to be in the generalized vocabulary of the tracker vocabulary associated with the tracker model. For example, if the submitted words exactly match a word or phrase in the tracker vocabulary, the match may be high. Likewise, in some embodiments, if the submitted words exactly match a word or phrases in the generalized vocabulary as learned by the training the universal generalization model, the match score will be high even if the submitted words are not present in the tracker vocabulary used to generate the tracker model.

At block 1112, in one or more of the various embodiments, the tracker engine may be arranged to update one or more tracker metrics for the one or more tracker models based on the one or more match scores.

As described above, in one or more of the various embodiments, a variety of tracker metrics may be generated based on tracker models and match scores. In some embodiments, tracker engines may be arranged to enable client to request one or more metrics of interest at the time the tracker vocabulary is provided to generate the tracker models. In some embodiments, tracker engines may be arranged to enable clients to provide scripts, callbacks, or the like, that enable the client that provided the tracker vocabulary for a tracker model to generate customized metrics.

For example, in some embodiments, tracker metrics may include, match counts, percentage of conversation stream that matched, conversation time-line distribution of the occurrence of matches, or the like.

In one or more of the various embodiments, tracker engines may be arranged to enable events, notifications, alarms, triggers, or the like, to be associated with one or more tracker models. Accordingly, in some embodiments, tracker engines may be arranged to generate one or more of events, notifications, alarms, triggers, or the like, in response to matched tracker models.

At decision block 1114, in one or more of the various embodiments, if the conversation stream may be complete, control may be returned to a calling process; otherwise, control may loop back to block 1102.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrative Use Cases

Figure 12:
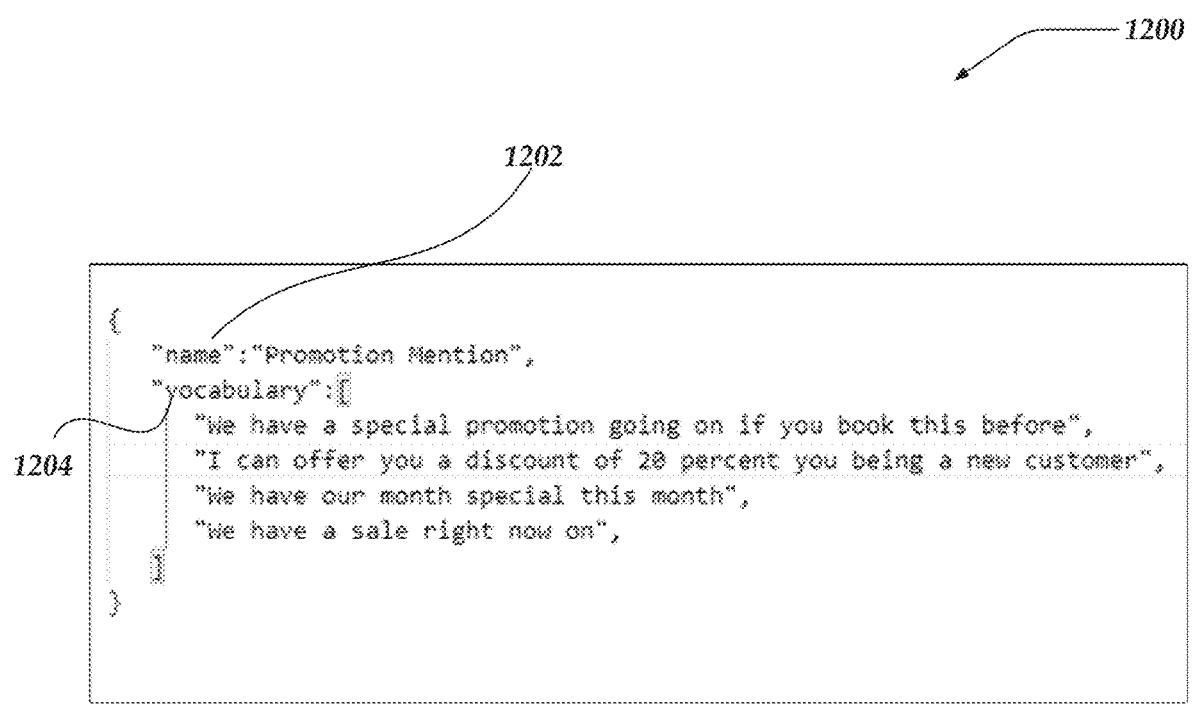
FIG. 12 illustrates a portion of a data structure for initializing tracker models for tracking concepts, topics, or activities in conversations in accordance with one or more of the various embodiments.

FIG. 12 illustrates a portion of data structure 1200 for initializing tracker models for tracking concepts, topics, or activities in conversations in accordance with one or more of the various embodiments.

In this example, for some embodiments, name field 1202 is a field that specifies a uniquely identifiable name given to the group/set of phrases defined by vocabulary field 1204. And, in this example, for some embodiments, vocabulary field 1204 specifies the set of phrases or keywords that need to be tracked in a conversation.

In some embodiments, tracker vocabularies that include audio samples or video samples may be similar to data structure 1200 except rather than including vocabulary fields that include text or phrases they may include audio, samples video samples, or the like. Alternatively, in some embodiments, vocabulary fields may include references to audio or video samples that may be stored elsewhere.

FIG. 13 illustrates a portion of data structure 1300 for initializing tracker models for tracking concepts, topics, or activities in conversations in accordance with one or more of the various embodiments.

As described above, tracker engines may be arranged to provide one or more APIs for processing conversation streams in real-time. In some embodiments, tracker engines may be arranged to provide one or more APIs that enable data structures, such as, data structure 1300 may be provided to define tracker models. In this example, data structure 1300 is represented a JSON, however, in some embodiments, other data formats, such as, XML, RPCs DCOM, or the like, may be employed to represent data structures for initializing tracker models. Also, in some embodiments, tracker engines may be arranged to provide conventional binary static or shared libraries that provide APIs for generating tracker models or monitoring tracker metrics.

In this example, data structure 1300 include several fields as described above. Note, for brevity and clarity rather than including reference numbers in the figure, the fields will be referenced using the field name in the data structure. Accordingly, in this example, data structure 1300 has the following fields:

id: A unique UUID that represents a session.

trackers: The tracker model to be employ for detected tracker vocabularies in real-time.

config: The config object encapsulates the metadata for the session. In this example, the metadata trackers: {interimResults: true} indicates that tracker metrics should be provided as soon as they are detected. If this value is set to false, the tracker metrics may be provided at the end of processing the conversation stream.

handlers: The object encapsulating the call-back functions to be invoked on detection of those specific entities.

onTrackerResponse: This function may be invoked when tracker models find matches in the conversation.

Note, one of ordinary skill in the art will appreciate that in production environments data structures or APIs used for interacting with tracker engines may include more or fewer fields than shown in this illustrative example. Further, as mentioned above, tracker engines or speech analysis platforms may be arranged to provide interactive user interfaces that enable users or administrators declare tracker vocabularies that may be used for generating tracker models.

What is claimed as new and desired to be protected by Letters Patent of the United States is:

1. A method for organizing conversation information over a network using one or more network computers that include one or more processors that are operative to execute instructions, wherein the execution of the instructions enable performance of actions, comprising:
   providing a vocabulary to a first model to predict a generalized vocabulary associated with the vocabulary, wherein the first model is trained to predict the generalized vocabulary that corresponds to the provided vocabulary;
   generating a second model based on one or more portions of the first model that are activated by the provided vocabulary, wherein a remainder portion of the first model is excluded from the second model;
   generating one or more scores based on the second model and one or more portions of a conversation, wherein the one or more scores predict the one or more portions of the conversation that are in the generalized vocabulary predicted for the provided vocabulary; and
   providing one or more reports or notifications for the one or more portions of the conversation stream and the one or more scores.

2. The method of claim 1, wherein the second model is configured to generate a score when a topic, a semantic meaning, a usage a sentiment, or an action of the conversation matches one or more of the topic, the semantic meaning, the usage, the sentiment, or the action associated the provided vocabulary.

3. The method of claim 1, wherein the second model is configured to generate a score when one or more of a sound, a gesture or a movement matches one or more of the sound, the gesture, or the movement of the provided vocabulary.

4. The method of claim 1, further comprising:
   collecting one or more metrics based on the one or more portions of the conversation and the one or more scores, wherein the one or more metrics are included in the one or more of reports or notifications.

5. The method of claim 1, further comprising:
   employing a sliding window to store one or more words for each portion of a real time stream of the conversation, wherein a size of the sliding window to store an amount of words is dynamically adjusted to improve predictions that the one or more portions of the conversation are in the generalized vocabulary.

6. The method of claim 1, wherein the conversation further comprises:

employing a sliding window to store non-text communication for each portion of a real time stream of the conversation that includes one or more of audio, video, image, or spatial information, wherein a size of the sliding window to store one or more of an amount of audio, video, image or spatial information is dynamically adjusted based on one or more of a time duration, an amount of data, or a video protocol.

7. The method of claim 1, further comprising:
providing a processor readable non-transitory storage media to store the instructions for organizing conversation information over the network that are executed by the one or more processors.

8. A network computer for organizing conversation information over a network, comprising:
a memory that stores at least instructions; and
one or more processors that execute instructions, wherein the executed instructions enable performance of actions, including:
providing a vocabulary to a first model to predict a generalized vocabulary associated with the vocabulary, wherein the first model is trained to predict the generalized vocabulary that corresponds to the provided vocabulary;
generating a second model based on one or more portions of the first model that are activated by the provided vocabulary, wherein a remainder portion of the first model is excluded from the second model;
generating one or more scores based on the second model and one or more portions of a conversation, wherein the one or more scores predict the one or more portions of the conversation that are in the generalized vocabulary predicted for the provided vocabulary; and
providing one or more reports or notifications for the one or more portions of the conversation stream and the one or more scores.

9. The network computer of claim 8, wherein the second model is configured to generate a score when a topic, a semantic meaning, a usage a sentiment, or an action of the conversation matches one or more of the topic, the semantic meaning, the usage, the sentiment, or the action associated the provided vocabulary.

10. The network computer of claim 8, wherein the second model is configured to generate a score when one or more of a sound, a gesture or a movement matches one or more of the sound, the gesture, or the movement of the provided vocabulary.

11. The network computer of claim 8, further comprising:
collecting one or more metrics based on the one or more portions of the conversation and the one or more scores, wherein the one or more metrics are included in the one or more of reports or notifications.

12. The network computer of claim 8, further comprising:
employing a sliding window to store one or more words for each portion of a real time stream of the conversation, wherein a size of the sliding window to store an amount of words is dynamically adjusted to improve predictions that the one or more portions of the conversation are in the generalized vocabulary.

13. The network computer of claim 8, wherein the conversation further comprises:
employing a sliding window to store non-text communication for each portion of a real time stream of the conversation that includes one or more of audio, video, image, or spatial information, wherein a size of the sliding window to store one or more of an amount of audio, video, image or spatial information is dynamically adjusted based on one or more of a time duration, an amount of data, or a video protocol.

14. The network computer of claim 8, further comprising:
determining one or more network nodes in the first model that were activated to predict the generalized vocabulary based on one or more activation functions associated with the one or more network nodes.

15. A system for organizing conversation information over a network, comprising:
a network computer, comprising:
a memory that stores at least instructions; and
one or more processors that execute instructions that enable performance of actions, including:
providing a vocabulary to a first model to predict a generalized vocabulary associated with the vocabulary, wherein the first model is trained to predict the generalized vocabulary that corresponds to the provided vocabulary;
generating a second model based on one or more portions of the first model that are activated by the provided vocabulary, wherein a remainder portion of the first model is excluded from the second model;
generating one or more scores based on the second model and one or more portions of a conversation, wherein the one or more scores predict the one or more portions of the conversation that are in the generalized vocabulary predicted for the provided vocabulary; and
providing one or more reports or notifications for the one or more portions of the conversation stream and the one or more scores.

16. The system of claim 15, wherein the second model is configured to generate a score when a topic, a semantic meaning, a usage a sentiment, or an action of the conversation matches one or more of the topic, the semantic meaning, the usage, the sentiment, or the action associated the provided vocabulary.

17. The system of claim 15, wherein the second model is configured to generate a score when one or more of a sound, a gesture or a movement matches one or more of the sound, the gesture, or the movement of the provided vocabulary.

18. The system of claim 15, further comprising:
collecting one or more metrics based on the one or more portions of the conversation and the one or more scores, wherein the one or more metrics are included in the one or more of reports or notifications.

19. The system of claim 15, further comprising:
employing a sliding window to store one or more words for each portion of a real time stream of the conversation, wherein a size of the sliding window to store an amount of words is dynamically adjusted to improve predictions that the one or more portions of the conversation are in the generalized vocabulary.

20. The system of claim 15, wherein the conversation further comprises:
employing a sliding window to store non-text communication for each portion of a real time stream of the conversation that includes one or more of audio, video, image, or spatial information, wherein a size of the sliding window to store one or more of an amount of audio, video, image or spatial information is dynamically adjusted based on one or more of a time duration, an amount of data, or a video protocol.

* * * * *